United States Patent
Sun et al.

(10) Patent No.: US 12,237,687 B2
(45) Date of Patent: Feb. 25, 2025

(54) WIND TURBINE POWER GENERATION COMPRISING AN AC-DC-AC CONVERTER AND A TRANSFORMER WITH A TAP CHANGER

(71) Applicant: VESTAS WIND SYSTEMS A/S, Aarhus N. (DK)

(72) Inventors: Bo Sun, Aarhus N (DK); Ciprian Biris, Hinnerup (DK); Catalin Gabriel Dincan, Aalborg Øst (DK); Philip Carne Kjær, Aarhus C (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 230 days.

(21) Appl. No.: 17/794,226

(22) PCT Filed: Jan. 19, 2021

(86) PCT No.: PCT/DK2021/050015
§ 371 (c)(1),
(2) Date: Jul. 20, 2022

(87) PCT Pub. No.: WO2021/148095
PCT Pub. Date: Jul. 29, 2021

(65) Prior Publication Data
US 2023/0133674 A1    May 4, 2023

(30) Foreign Application Priority Data
Jan. 21, 2020   (DK) .......................... PA 2020 70042

(51) Int. Cl.
*H02J 3/38*      (2006.01)
*H01F 29/04*    (2006.01)
(Continued)

(52) U.S. Cl.
CPC .............. *H02J 3/381* (2013.01); *H01F 29/04* (2013.01); *H02J 3/0012* (2020.01);
(Continued)

(58) Field of Classification Search
CPC ...... H02J 3/381; H02J 3/0012; H02J 3/00125; H02J 3/388; H02J 2203/10; H02J 2300/28; H01F 29/04; H02M 1/0025
See application file for complete search history.

(56) References Cited

U.S. PATENT DOCUMENTS

| 2010/0109447 | A1 | 5/2010 | Achilles et al. |
| 2010/0264666 | A1 | 10/2010 | Bo et al. |

(Continued)

FOREIGN PATENT DOCUMENTS

| EP | 2721705 B1 | 3/2015 |
| EP | 3591785 A1 | 1/2020 |

(Continued)

OTHER PUBLICATIONS

Danish Patent and Trademark Office, 1st Technical Examination Including The Search Report and Search Opinion for Application PA 2020 70042 dated Jul. 30, 2020.
(Continued)

*Primary Examiner* — Kyle J Moody
(74) *Attorney, Agent, or Firm* — Patterson + Sheridan, LLP; Gero G. McClellan; Charles Yeh

(57) ABSTRACT

A method of operating a power generating system for a wind turbine connected to an electrical grid, the power generating system comprising a power generator, a converter, a transformer and a tap changer, the method comprising; when operating the power generating system in a grid-forming configuration, monitoring a signal for detecting a voltage of the electrical grid which requires an increase in output voltage from the power generating system in order to
(Continued)

maintain the grid voltage within a predetermined voltage range; and operating the tap changer to tap-up the transformer to provide at least part of the voltage increase required to maintain the grid voltage within the predetermined voltage range.

11 Claims, 10 Drawing Sheets

(51) Int. Cl.
*H02J 3/00* (2006.01)
*H02M 1/00* (2006.01)
(52) U.S. Cl.
CPC .......... *H02J 3/00125* (2020.01); *H02J 3/388* (2020.01); *H02M 1/0025* (2021.05); *H02J 2203/10* (2020.01); *H02J 2300/28* (2020.01)

(56) References Cited

U.S. PATENT DOCUMENTS

| | | | |
|---|---|---|---|
| 2016/0065105 | A1 | 3/2016 | Hardwicke, Jr. et al. |
| 2016/0146191 | A1 | 5/2016 | Berroteran Gil et al. |
| 2018/0119674 | A1* | 5/2018 | Kjær .................. H02J 3/381 |

FOREIGN PATENT DOCUMENTS

| | | |
|---|---|---|
| GB | 2410386 A | 7/2005 |
| WO | 2016177376 A1 | 11/2016 |
| WO | 2021148095 A1 | 7/2021 |

OTHER PUBLICATIONS

PCT, International Search Report for Application PCT/DK2021/050015 dated Dec. 5, 2021.
PCT, Written Opinion of The International Searching Authority for Application PCT/DK2021/050015 dated Dec. 5, 2021.

* cited by examiner

| IEC Category | 0 - 4.96 MW 0-10 m/s (W) | 4.96 - 5.6 MW 10-11 m/s (X) | 5.6 – 6.16 MW 11-20 m/s (Y) | Cut-out 20-25 m/s (Z) |
|---|---|---|---|---|
| I | 63.21 | 6.97 | 28.00 | 1.82 |
| II | 74.94 | 6.32 | 18.34 | 0.40 |
| III | 83.10 | 5.27 | 11.55 | 0.08 |
| IV | 93.78 | 2.75 | 3.47 | 0.00 |

| Severity/Approach | UDC Increase (82) | Reactive power absorption (84) | Tap Changer Adjustment (86) | Over-modulation (88) | Pulse-wave Modulation Blocking (90) |
|---|---|---|---|---|---|
| Severity 1 | - | 2 | 1 | - | - |
| Severity 2 | 1 | 2 | 3 | 1 | - |
| Severity 3 | 2 | 3 | 4 | 2 | 1 |

Figure 11

WIND TURBINE POWER GENERATION COMPRISING AN AC-DC-AC CONVERTER AND A TRANSFORMER WITH A TAP CHANGER

TECHNICAL FIELD

The invention relates to wind turbines, particularly to the control of power generating systems of wind turbines.

BACKGROUND

A wind turbine typically includes a tower, a generator, a gearbox, a nacelle, and a rotor having one or more rotor blades. The rotor blades transform wind energy into a mechanical rotational torque that drives one or more generators via the rotor. The generators are rotationally coupled to the rotor through the gearbox. A power converter with a regulated DC link controlled by a converter controller is further provided to convert a frequency of generated electric power to a frequency substantially similar to a grid frequency.

Renewable energy power generator systems, such as the wind turbine described above, are typically operated within predetermined voltage and power factor tolerance ranges. The operational tolerance ranges enable the wind turbine to supply a reliable transmission of electrical power to the grid over a variety of operating conditions and to provide ancillary functions, such as the injection and absorption of reactive power, in order to support grid stability. For example, a grid voltage tolerance range may extend from 90% to 110% of the nominally rated voltage whilst a typical electrical grid power factor tolerance range extends from +0.9 to −0.9 power factor (pf). These operational tolerance ranges define the electrical parameters for all components connected to the grid including the current rating and power draw for voltages in the lower end of the voltage range and the voltages at the upper end of the voltage range.

It is known to configure the grid connected wind turbines so that they operate within a voltage and/or power factor range that is complimentary to the operational tolerance ranges associated with the grid. In particular, each wind turbine is arranged to operate within a pre-determined range of parameter values, which includes power generation, current, voltage, and power factor.

In order to accommodate the potential large voltage transients in the electrical power grid, each of the 'complimentary' wind turbines may be operated for prolonged periods below their upper power and current parameters. Operating the wind turbines in this way reduces their operating effectiveness and efficiency, leading to an under-utilisation of latent wind energy resource, whilst also incurring potential economic losses for the owners/operators of the wind farms.

Furthermore, for a typical wind turbine its operating parameters are limited by a maximum voltage for one or more of the components of the power generating system. For example, a wind turbine may be required to provide reactive power to the grid, which would impose over-voltage conditions on transformer windings where the converter is connected. Thus, when the converter provides reactive power, the resulting voltage may exceed a maximum specified continuous operating voltage level. In order to mitigate such over-voltage conditions, the converter can be operated to shift the power factor away from the required value; however, this is not always optimal.

Accordingly, there is need to improve systems and methods of optimising wind turbine operation while also maintaining voltage levels within specified operating ranges. It is against this background to which the present invention is set.

SUMMARY

According to a first aspect of the invention there is provided a method of operating a power generating system for a wind turbine connected to an electrical grid, the power generating system comprising a power generator, a converter, a transformer and a tap changer, the method comprising; when operating the power generating system in a grid-forming configuration, monitoring a signal for detecting a voltage of the electrical grid which requires an increase in output voltage from the power generating system in order to maintain the grid voltage within a predetermined voltage range; and operating the tap changer to tap-up the transformer to provide at least part of the voltage increase required to maintain the grid voltage within the predetermined voltage range.

The control method ensures that the converter, which may be decoupled from the grid due to an earlier adjustment of the tap changer, is controlled in dependence on an accurate representation of the grid voltage. In this way, the control method enables the wind turbine to match the demands of the grid whilst enhancing the power output capability of the power generating system.

The power generating system may comprise a converter; the method may comprise operating the converter to provide a converter voltage reference to maintain the grid voltage in the predetermined voltage range.

The method may comprise determining a tap changer position of the tap changer, and upon determining that the tap changer is not configured in a neutral position, updating the converter voltage reference based on the tap changer position.

Updating the converter voltage reference may comprise: monitoring a first signal indicative of a tap position of the tap changer: monitoring a second signal indicative of a converter voltage reference corresponding to the tap changer being operated in a neutral position; and determining a new converter voltage reference based on the first and second signals.

Determining the new converter voltage reference may comprise:

$$U_{ref-new} = \frac{n_2 + \Delta n * N_{TC}}{n_2} U_{ref-old}$$

wherein the new converter voltage reference $U_{ref-new}$ defines a 'tap-adjusted' converter voltage reference, $n_2$ is a number of windings at the high-voltage side of the transformer, $N_{TC}$ is a tap position of the tap changer, and $\Delta n$ is a change in the number of windings at the high-voltage side of the transformer for a given tap position.

The new converter voltage reference may comprise voltage amplitude.

The method may comprise operating the power generating system in an islanded configuration.

The method may comprise operating the power generating system in a grid-connected configuration.

Monitoring the signal for detecting an over-voltage condition in the electrical grid may comprise; monitoring a first signal indicative of a tap position of the tap changer; monitoring a second signal indicative of a voltage at a low-voltage side of the transformer; and determining the voltage at a high-voltage side of the transformer based on the first and second signal.

Determining the voltage at the high-voltage side of the transformer may comprise:

$$U_{LV-virtual} = \frac{n_2 + \Delta n * N_{TC}}{n_2} U_{LV}$$

wherein $U_{LV-virtual}$ defines a virtual voltage at the low-voltage side of the transformer when the tap changer is configured in a neutral position, $n_2$ is a number of windings at a high-voltage side of the transformer, $N_{TC}$ is the tap position of the tap changer, $\Delta n$ is a change in the number of windings at the high-voltage side for a given tap position, and $U_{LV}$ defines the actual voltage at the low-voltage side of the transformer;

wherein an over-voltage condition is detected if both the virtual voltage $U_{LV-virtual}$ and the actual voltage $U_{LV}$ are determined to be within an over-voltage range.

Determining the voltage at the high-voltage side of the transformer may comprise:

$$U_{HV-estimate} = \frac{n_2 + \Delta n * N_{TC}}{n_1} U_{LV} + I_{reactive} * X_{HV}$$

wherein $U_{HV-estimate}$ defines an estimated voltage at the high-voltage side of the transformer when the tap changer is configured in a neutral position, $n_2$ is a number of windings at a high-voltage side of the transformer, $n_1$ is a number of windings at the low-voltage side of the transformer, $N_{TC}$ is the tap position of the tap changer, $\Delta n$ is a change in the number of windings at the high-voltage side for a given tap position, $U_{LV}$ defines the actual voltage at the low-voltage side of the transformer, $I_{reactive}$ is a reactive current of the transformer, and $X_{HV}$ is an impedance of the transformer;

wherein an over-voltage condition is detected if the estimated voltage $U_{HV-estimate}$ is determined to be within an over-voltage range.

According to a second aspect of the invention there is provided a controller for controlling a power generating system comprising a power generator, a generator side converter, a grid side converter, a transformer, a tap changer for a wind turbine, the controller being arranged to be connected to the power generating system and configured to control the power generating system according to the method of any preceding claim.

According to a third aspect of the invention there is provided a power generating system for a wind turbine which is connected to an external electrical grid, the power generating system comprising a converter, a transformer, a tap changer, and a controller, the controller comprising: an input arranged to receive a signal indicative of a voltage of the electrical grid; a determining module arranged to detect a voltage of the electrical grid which requires an increase in output voltage from the power generating system (20, 120) in order to maintain the grid voltage within a predetermined voltage range; a transformer control module arranged to determine a transformer control signal to control the tap changer to adjust the transformer; and an output arranged, upon detection of the demand to increase the grid voltage, to transmit the transformer control signal to operate the tap changer to tap-up the transformer to provide at least part of the voltage increase required to maintain the grid voltage within the predetermined voltage range.

The power generating system may comprise a converter control module arranged to operate the converter to provide a converter voltage reference to maintain the grid voltage in the predetermined voltage range.

It will be appreciated that the foregoing represents only some of the possibilities with respect to a control method for controlling a power generating system. Accordingly, it will be further appreciated that embodiments of a control method which include other or additional method steps remain within the scope of the present invention. Additional sub-method steps may relate to other method steps relating to the operation of a wind turbine.

The set of instructions (or method steps) described above may be embedded in a computer-readable storage medium (e.g. a non-transitory storage medium) that may comprise any mechanism for storing information in a form readable by a machine or electronic processors/computational device, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

BRIEF DESCRIPTION OF THE DRAWINGS

Examples of the invention will now be described, by way of example only, with reference to the accompanying drawings, in which:

FIG. 11 is a table describing a number of strategies for mitigating an extreme over-modulation condition of the power generating system of FIGS. 2 and 3;

DETAILED DESCRIPTION

Figure 1:
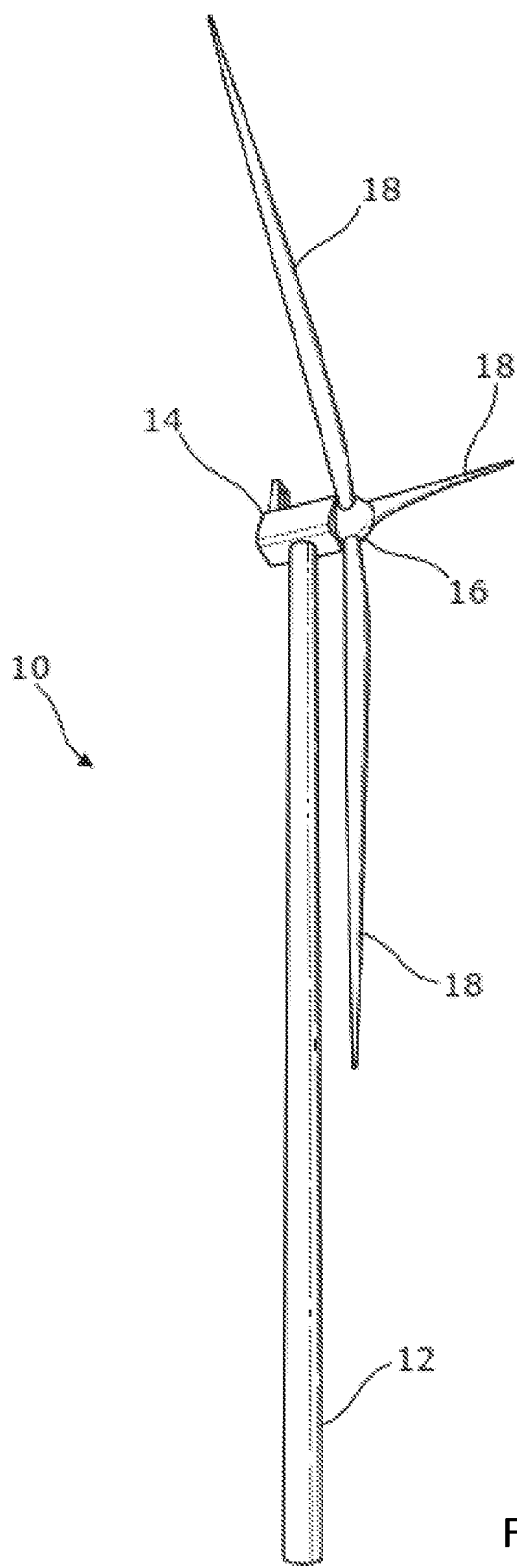
FIG. 1 illustrates a wind turbine including nacelle and a plurality of rotor blades.

FIG. 1 shows a wind turbine 10 including a tower 12, a nacelle 14 rotatably coupled to the top of the tower 12, a rotor 16 including a rotor hub mounted to the nacelle 14, and a plurality of wind turbine rotor blades 18—in the described example, three rotor blades—which are coupled to the rotor hub. The nacelle 14 and rotor blades 18 are turned and directed into the wind direction by a yaw system. The wind turbine 10 is shown in its fully-installed form suitable for operation; in particular, the rotor 16 is mounted on the nacelle 14 and each of the blades 18 are mounted on the rotor hub. The rotor 16 is rotatable by action of the wind during operation of the wind turbine 10 in order to convert the kinetic energy of the wind into rotational energy of the rotor 16.

Figure 2:
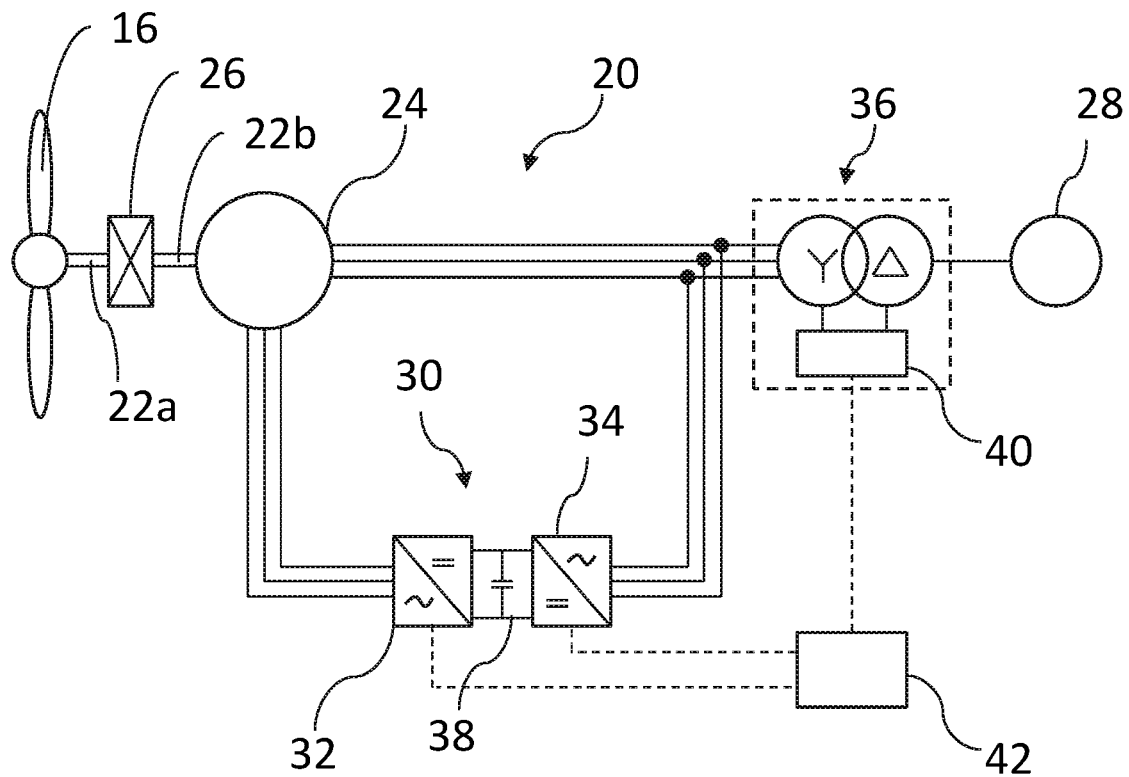
FIG. 2 illustrates a power generating system of the wind turbine of FIG. 1.
Figure 3:
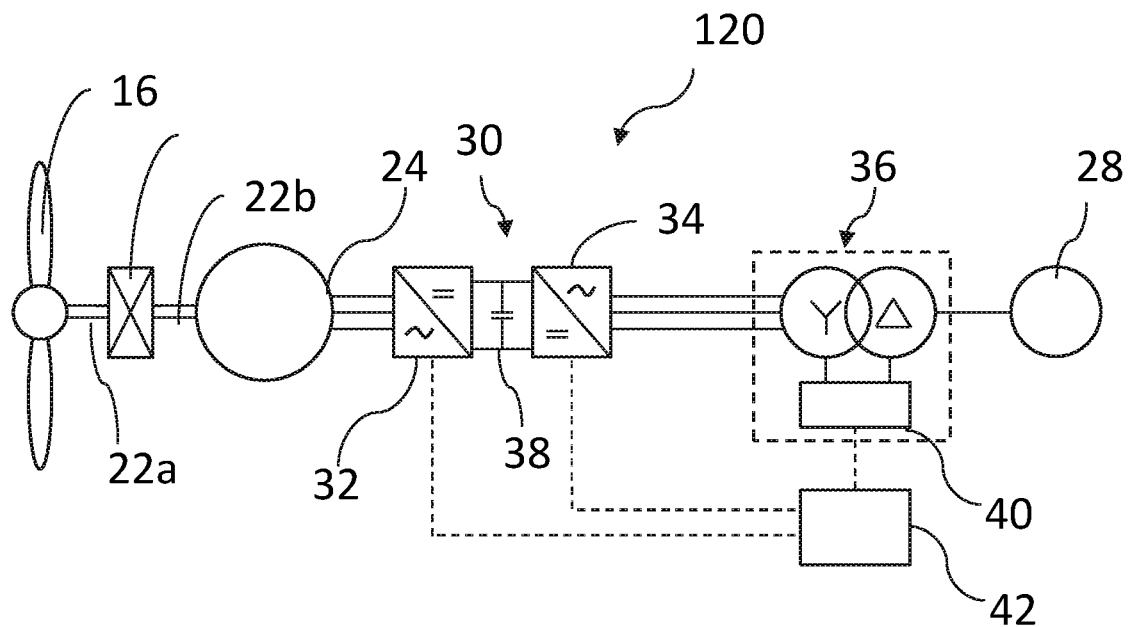
FIG. 3 illustrates an alternative power generating system of the wind turbine of FIG. 1.

With particular reference to FIGS. 2 and 3, the nacelle 14 houses a power generating system 20, 120 which is capable of converting the rotational energy of the rotor 16 into electric power which can be supplied to an electrical grid 28—or grid 28. Note that FIGS. 2 and 3 illustrate two different versions of power generating architectures within which embodiments of the invention may apply, so both generating system will be discussed here in broad terms so as to introduce the main functional components. During operation of the wind turbine 10, the wind induced rotational energy of the rotor 16 is transferred via a shaft 22 to a generator 24, 124. A first portion 22a of the shaft 22 is rotatably coupled at one end to the rotor 16 and at another end to a gearbox assembly 26. The gearbox assembly 26 is arranged to transfer the rotational speed of the first shaft portion 22a to the generator 24 via a second shaft portion 22b which is rotatably coupled therebetween. The gearbox assembly 26 includes a step-up ratio which increases the rotational speed of the second shaft portion 22b compared to the first shaft portion 22a. In this way, the gearbox assembly 26 steps up the inherently low rotational speed of the rotor 16 for the generator 24 to efficiently convert the rotational mechanical energy to electrical energy, which is fed into the grid 28 via at least one electrical connection.

Each of the exemplary power generating systems 20, 120 described herein are provided with a gearbox assembly 26 arranged to transfer power between the rotor 16 and the generator 24. However, the methods and systems according to the present invention would also apply to a power generating system comprising a direct-drive connection between the rotor and the generator, as would be readily understood by a person having ordinary skill in the art.

The generator 24 of the power generating system 20 shown in FIG. 2 is a three-phase, double-fed induction (asynchronous) generator (DFIG), which includes a generator stator which is magnetically coupled to a generator rotor coil (not shown). A portion of the electrical power generated by the generator 24 is transferred from the generator stator to a converter assembly 30 of the power generating system 20, and the remainder of the generated power is transferred from the generator rotor coil directly to the grid 28.

According to an alternative arrangement of the power generating system 120, the generator 24 is a permanent magnet generator 124, as illustrated in FIG. 3. The permanent magnet generator 124 includes a permanent magnet rotor (not shown) from which substantially all of the power generated from the generator 124 is directed to grid 28 via a converter assembly 30.

In each of the power generating systems 20, 120 shown in FIGS. 2 and 3, the respective generators 24, are electrically connected to a generator side converter 32—or a machine side converter—of the converter assembly 30. The generator side converter 32 is connected to a grid side converter 34 via a DC-link 38 which includes a positive rail, a negative rail and one or more DC-link capacitors coupled therebetween. During operation of the wind turbine 10, the DC-link capacitors are charged by the DC output current from the generator side converter 32, which thereby supplies DC power to the grid side converter 34. An output AC current from the grid side converter 34 is supplied via a transformer 36 to the grid 28.

The transformer 36 of each of the power generating systems 20, 120 includes a tap changer assembly 40—or tap changer 40, which enables switching, or 'tapping', between different turn ratios of the transformer 36 in order to control the voltage output to the grid 28. The power generating system 20, 120 includes a controller 42 arranged to monitor and control the operation of the power generating system 20, 120, as will be described in more detail below.

Figures 4, 5:
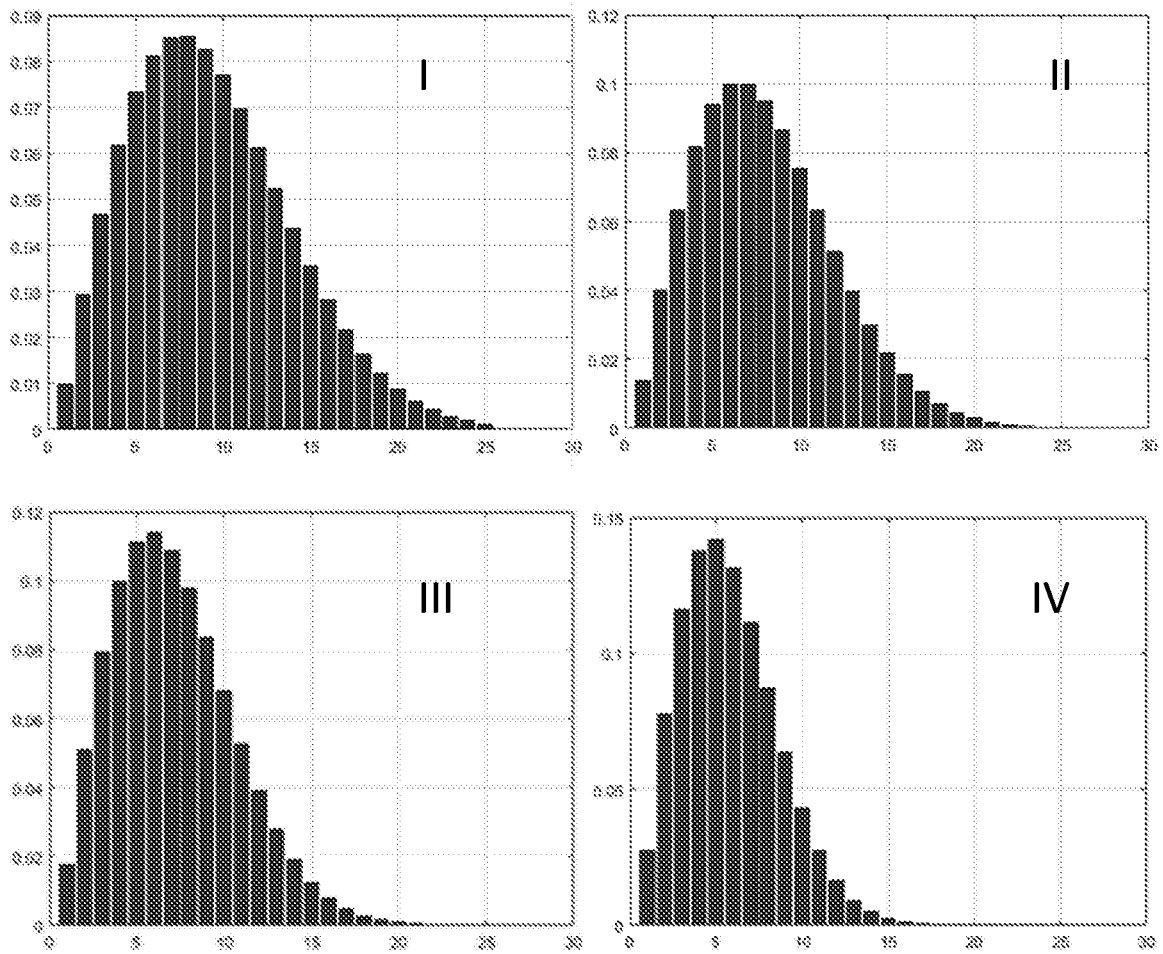
FIG. 4 shows a set of International Electrotechnical Commission (IEC) wind distribution charts corresponding to four different wind conditions experienced by the wind turbine of FIG. 1.
FIG. 5 is a table indicating the distribution of time that the wind turbine of FIG. 1 is subjected to different wind conditions.

With reference to FIGS. 4 and 5, the operation of the power generating system 20, 120 will now be described with reference to the different operational conditions of the wind turbine 10. In particular, FIG. 4 shows a set of International Electrotechnical Commission (IEC) wind distribution charts corresponding to four different wind conditions I, II, III and IV. Each of the wind distribution charts illustrates a typical distribution vs. frequency of the wind speeds associated with each of the four wind condition categories I-IV.

FIG. 5 is a table summarising the data shown in FIG. 4, and relates to a wind turbine 10 which is configured to deliver a maximum power output of 6.16 MW. The data in FIG. 5 represents an example of many possible In particular, the converter assembly 30 is rated to deliver a maximum active power P of 5.6 MW when the tap changer 40 is set to a neutral condition. Tapping up the tap changer 40 by +10% increases the maximum output power to 6.16 MW. Conversely, by tapping down the tap changer 40 by −10%, the minimum active power P is reduced to 4.98 MW. Tapping down the tap changer 40 also increases the current by 11%.

The columns labelled W, X, Y and Z represent four different operating conditions of the power generating system 20, 120. Each of the four operating conditions W, X, Y and Z is associated with a different range of wind speeds experienced by the wind turbine 10. For example, operating condition W is associated with a wind speed of 0 to 10 metres per second (m/s), which corresponds to an operating power output from the power generating system 20, 120 of between 0 to 4.98 MW.

Operating condition W corresponds to an under-modulation of the wind turbine 10 in which the wind speed is below an optimum level for power generation, whereas operating condition X corresponds to an optimum wind condition for power generation. For certain situations, the operating conditions Y and Z correspond to an over-modulation condition and a cut-out condition, respectively. The over-modulation condition corresponds to the situation in which the wind turbine 10 is required to operate above its optimum operating condition but still within manageable range of the power generating system 20, 120. The cut-out condition corresponds to a situation in which the wind speed is so high that the power generating system 20, 120 is shut down in order to protect the components of the wind turbine 10.

Each row of the table describes the relative time in which the power generating system 20, 120 is operated according to each of the four operating conditions 1-4, as a percentage of the total wind turbine operation. The four rows correspond to the different wind condition categories I-IV. For example, the power generating system 20, 120 is operated according to operating condition W for 63.21% of the time during wind conditions corresponding to wind category IV. More generally, operating condition W occurs between 63-93% of the time, scheme X occurs between 3-7% of the time and scheme Y occurs between 3.5-28% of the time. By contrast, scheme Z has a significantly rarer incidence rate, occurring less than 1.8% of time.

The power generating system 20, 120 is controlled according to a different control method—or operating scheme—depending on which of the operating conditions W, X, Y and Z the wind turbine 10 is operating within. Each control method is implemented by a controller 42 of the power generating system 20, 120 according to the present invention.

Figure 6:
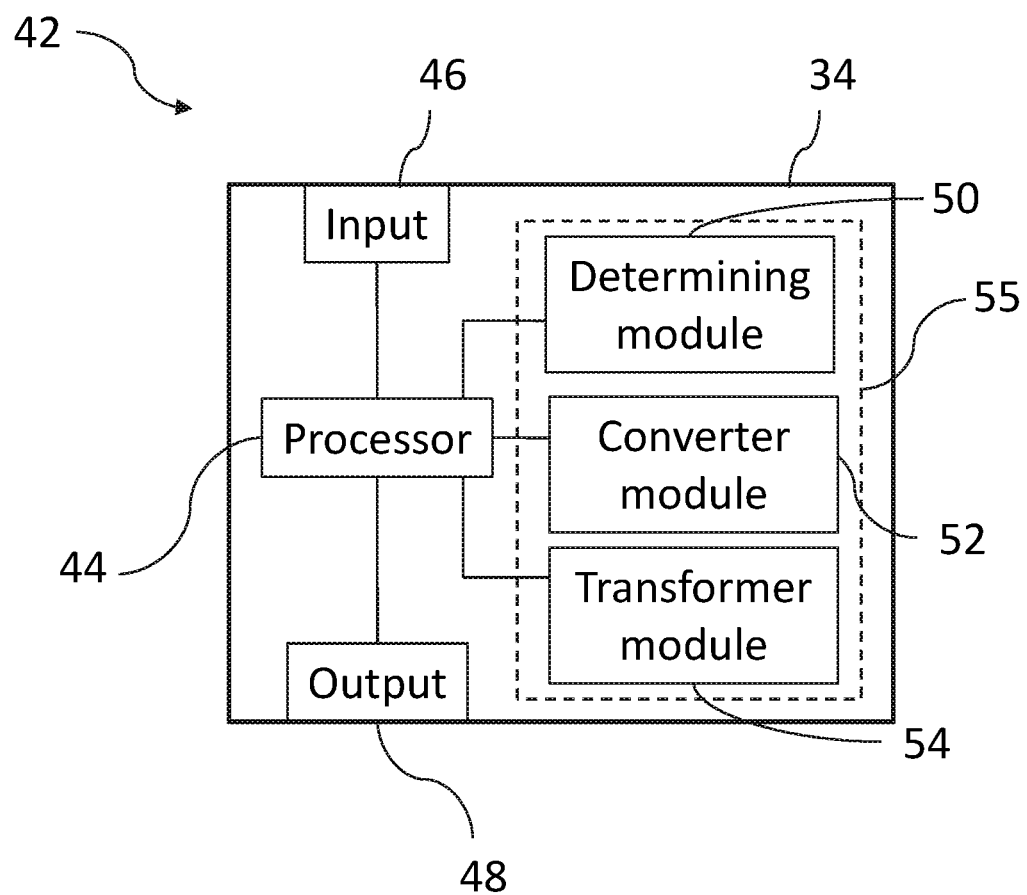
FIG. 6 illustrates a controller of the power generating system of FIG. 2.

The controller 42 includes a number of processing modules 50, 52, 54 including a determining module 50, a converter control module 52 and a transformer control module 54, as shown in FIG. 6. The controller 42 also includes an input 46 and an output 48 which are arranged to facilitate communications between the controller 42 and the power generating system 20, 120, as illustrated by the connections shown in FIG. 2 between the controller 42, the transformer 36 and the converter assembly 30.

The primary function of the controller 42 is to operate the power generating system 20, 120 according to one or more control schemes, as will described in more detail below. Each of the modules 50, 52, 54 is configured to perform a variety of functionalities depending on which control scheme is being implemented by the controller 42.

Generally, the determining module 50 is arranged to monitor and interpret different parameters, including environmental and operational parameters of the wind turbine 10, which may affect the power generation system 20, 120. The converter control module 52—or converter module 52—is configured to control the operation of the converter assembly 30. Similarly, the transformer control module 54—or transformer module 54—is arranged to control the transformer 36 via the tap changer 40.

The input 46 and output 48 each include one or more signal converters which are arranged to permit signals transmitted to and from the controller 42. For example, the input signal converter is configured to convert the signals received from the components of the power generating system 20, 120 into a medium that can be interpreted by the controller 42. Similarly, the output signal converter is arranged to convert outputted signals into a medium that can be understood by the component of the power generating system 20, 120.

The input 46 is arranged to receive a variety of inputs—or input signals—relating to both the configuration and operation of the power generating system 20, 120. A configuration input—or configuration input signal—defines how a particular component of the power generating system 20, 120 has been configured so as to carry out its function.

An exemplary configuration input includes information relating to the range of voltages which the converter assembly 30 is operable to output during normal use. Alternatively, the configuration input includes a number of tap change positions of the tap changer 40. The different tap changer positions are, in turn, indicative of a corresponding turn ratio of the transformer 36.

The configuration input signals are transmitted to the controller 42 by a user of the power generating system 20, 120 via a human machine interface (not shown). Alternatively, or in addition, each of the configuration inputs may be provided in the form of a lookup table which is stored on a suitable storage medium.

The input 46 is also arranged to receive operating inputs—or operating input signals—which define an operating condition of a particular component during operation of the power generating system 20, 120. An exemplary operating input includes voltage and/or electric current measurements received from one or more voltage and electric current sensors (not shown) of the power generating system 20, 120.

The voltage and current sensors are electrically connected to the components, or to electrical connections between the components, of the power generating systems 20, 120, as would be readily understood by the skilled person. An alternative operating input may be indicative of the current tap change position of the tap changer 40. Further exemplary operating inputs relate to the operating parameters of the converter assembly 30, including the detectable operating parameters of the machine side converter 32, the grid side converter 34 and the DC-link 38.

Under-Modulation Control Scheme 60

An exemplary control method 60 for operating the power generating system 20, 120 according to a first aspect of the present invention will now be described with reference to FIGS. 7, 8 and 9. The control method 60 is particularly suited for controlling the power generating system 20, 120 in situations when the wind turbine 10 is operating under schemes W and X.

The control method 60 corresponds to a wind turbine 10 which is operated to support the voltage and power levels in the grid 28. Such grid-feeding, or grid-supporting, configurations require the power generating system 20, 120 to deliver active and reactive power P, Q to the grid 28. In this situation, the controller 42 acts as a primary control by setting an operation point for each of the converter assembly 30 and tap changer 40, as a function of their respective capacities, in order to maximise the power generating capacity of the wind turbine 10. Operation of the power generating system 20, 120 may be controlled by a secondary control (i.e. an electrical grid controller) which is arranged to set active and reactive power references P*, Q*. The main objective of the secondary control is to minimise the voltage and the frequency deviations within the grid 28.

The determining module 50 is arranged to determine a set of control parameters based on the configuration of the components of the power generating system 20, 120. The converter and transformer modules 52, 54 are then arranged to calculate, in dependence on receiving a demand signal, one or more control signal(s) for controlling the power generating system 20, 120.

The determining module 50 is primarily arranged to determine the set of control parameters when the power generating system 20, 120 is in an offline condition, i.e. when the wind turbine 10 is not supplying power to the grid 28. Further, the determining module 50 may determine the control parameters prior to the power generating system 20, 120 being installed within the wind turbine 10. In addition, the determining module 50 can be operated to update the control parameters in response to a change in the configuration of the system's components. Such changes may occur following the replacement of one or more of the components of the power generating system 20, 120. In contrast to the determining module 50, the converter and transformer modules 52, 54 are configured to be operated during an online condition of the power generating system 20, 120, i.e. during the operation of the wind turbine 10.

The operation of the determining module 50 will now be described with particular reference to FIG. 7, which shows a schematic of the control parameters as determined by the determining module 50. The determining module 50 receives a configuration input relating to the converter assembly 30 and transformer 36. The determining module 50 is arranged to determine, from the configuration input corresponding to the converter assembly 30, that the converter assembly 30 is configured to operate in seven distinct operating modes, labelled C1, C2, C3, C4, C5, C6 and C7 in FIG. 7.

Each of the converter operating modes C1-C7 correspond to a converter output voltage $U_C$ which range from 0.87 per unit system (pu), for C1, to 1.13 pu, for C7. In particular, converter operating modes C1-C7 correspond to converter output voltages $U_C$ of 0.87 pu, 0.9 pu, 0.95 pu, 1.0 pu, 1.05 pu, 1.1 pu and 1.13 pu, respectively. It will be appreciated that the seven voltage modes C1-C7 are described herein as exemplary operating modes of the converter assembly 30. For example, the converter assembly 30 may be configured to output a range of converter operating voltages which are separated by 0.1 pu, or alternatively less than 0.1 pu. In some situations, the operation of the converter may be defined by a greater or smaller number of operating modes, as would be readily understood by the skilled person.

The tap changer 40 is configured to apply a tap change adjustment—or tap change value—to each of the operating modes C1-C7 of the converter assembly 30. The tap change adjustment defines the extent to which the transformer 36 is tapped up or down by the tap changer 40. For example, the determining module 50 determines that the tap changer 40 should be configured to apply a tap change adjustment of plus or minus ten percent (+/−10%) to the converter output voltage $U_C$ which it receives from the converter assembly 30. It will be appreciated by the skilled person that the tap change adjustment values described above (i.e. +/−10% represent an exemplary aspect of the determining module 50. The tap changer may be configured to apply a range of adjustments to the transformer, depending on the requirements of the power generating system.

For the exemplary case of operating mode C1, the tap changer 40 is capable of tapping-up and tapping-down the converter output voltage $U_C$ (i.e. 0.87 pu) such that the tap change adjusted' output voltage range is between 0.77 pu and 0.97 pu. Similarly, the nominal range of output voltages corresponding to operating mode C2 is between 0.7 pu and 0.9 pu.

The determining module 50 is arranged to determine the nominal range of output voltages obtained by tapping up and tapping down the converter output voltages $U_C$ which correspond to the converter operating modes C1-C7. Put another way, the determining module 50 is configured to determine the tap change adjusted output voltage range for each of the converter operating modes C1-C7. The determined operating parameter data (i.e. the range of 'tap change adjusted' converter output voltages) is stored on a memory device 55 of the controller 42.

Figure 7:
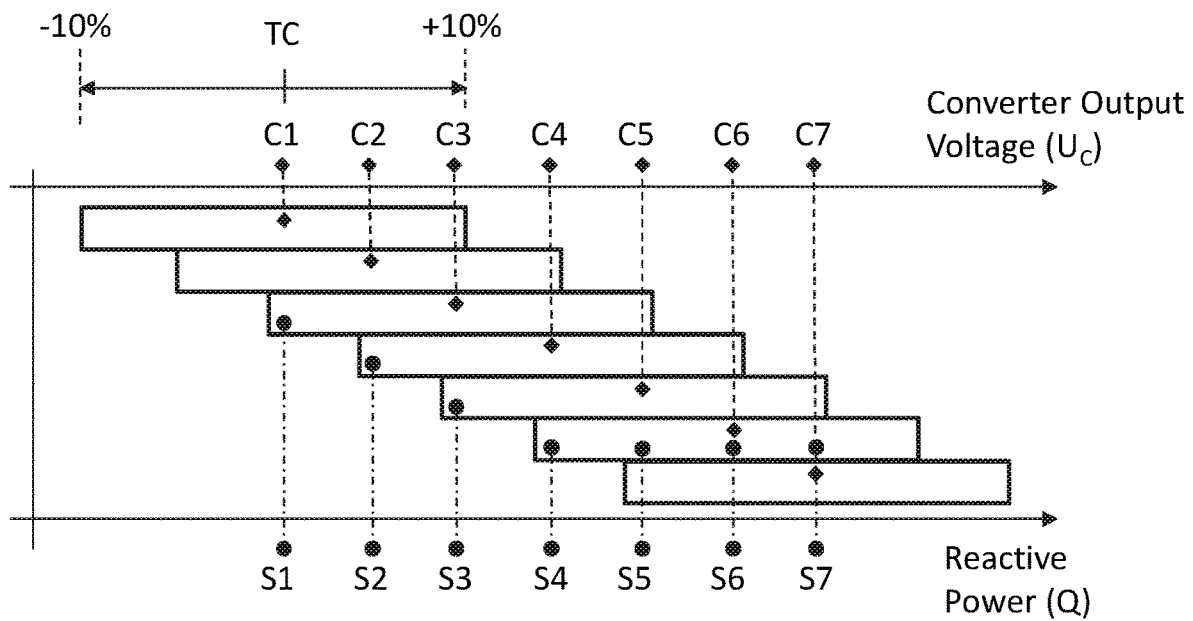
FIG. 7 is a visual representation of the determined configuration parameters of the power generating system of FIG. 2, as determined by the controller of FIG. 6.

Owing to the available tap change adjustment, it will be appreciated that there is significant overlap between the different ranges of tap change adjusted output voltage, as represented by the horizontal bars shown in FIG. 7. For example, the non-adjusted converter output voltage $U_C$ corresponding to operating mode C1 is 0.87 pu. A substantially similar output voltage can also be achieved by switching the converter assembly 30 to converter operating mode C2 (i.e. with a converter output voltage of 0.90 pu) and by tapping down the converter output voltage by-5%. Alternatively, the same output voltage can also be achieved by tapping down the output voltage of converter operating mode C3 (i.e. 0.95 pu) by 10%.

Each of these three configurations result in a different level of reactive power Q being available to be transmitted into, or absorbed from, the grid 28, despite producing substantially the same output voltage. By operating the converter assembly 30 according to the first configuration (i.e. applying converter operating mode C1 with no adjustment to the tap changer 40) it results in a reactive power value Q of 1.018 pu, for example. By comparison, the reactive power value Q corresponding to the second configuration (i.e. converter operating mode C2 combined with a −5% tap change adjustment) is 1.341 pu and for the third configuration (i.e. converter operating mode C3 combined with a −10% tap change adjustment) the reactive power value Q is 1.396 pu.

Accordingly, the determining module 50 is arranged to determine the reactive power value Q corresponding to each possible configuration of the converter assembly 30 and tap changer 40. The determining module 50 is also configured to determine the converter assembly 30 and tap changer 40 operating parameters corresponding to each of the respective reactive power values. The operating parameters are then stored, along with the tap change adjusted voltage data, in the memory device 55 of the controller 42.

Having calculated the associated reactive power value for each of the possible operating parameter combinations, the determining module 50 is further configured to determine a set of optimised operating parameters S1, S2, S3, S4, S5, S6 and S7, by which the system can be controlled in order to deliver a desired output to the grid 28. Each of the operating parameters S1-S7 is determined to control the system to transmit a required voltage output to the grid. To achieve this, each operating parameter S1-S7 comprises a converter output voltage (i.e. corresponding to one of the converter operating modes C1-C7) and a tap changer adjustment (i.e. applying an adjustment to the transformer 36 of between +10% and −10%, for example).

The optimised operating parameters S1-S7 are further configured to maximise the power generating capability of the wind turbine generator 10. According to an exemplary arrangement of the controller 42, the determining module 50 is configured to determine the converter assembly 30 and the tap changer 40 operating parameters which maximise the reactive power Q output of the power generating system 20, 120. For example, the first optimised operating parameter S1 comprises operating the converter assembly 30 in operating mode C3 and with the tap changer 40 being configured to tap down the transformer 36 by −10%. As described above, this combination of converter assembly 30 and tap changer 40 operating parameters provides the maximum reactive power output of 1.396 pu for the corresponding output voltage of 0.87 pu.

By tapping down the tap changer 40 when in a partial load condition, the optimised operating parameter S1 advantageously increases the over voltage ride through (OVRT) capabilities of the system 20, 120 compared to a system which does not include a tap changer. This is because the wind turbine generator 10 only operates at full load for a portion of its operational life, and the rest of the time it will operate in a partial load condition. Accordingly, by tapping down the converter output voltage during partial load conditions, and thereby increasing the converter operating current, the associated converter losses are reduced for the majority of the converter's operational life.

As a further example of the operation of the determining module 50 according to the present invention, we now refer to converter operating mode C7 in FIG. 7 for which the nominal converter output voltage is 1.13 pu. The optimised operating parameter S7 corresponding to this output voltage includes operating the converter assembly 30 according to operating mode C6 and then tapping up the tap changer 40 by 5%. Tapping-up the voltage +5% increases the reactive power output Q by 5% with the same current passing through the converter assembly 36. Thus, the power generating system 20, 120 is able to output more reactive power Q than an equivalent power generating system which does not include a tap changer.

Furthermore, by applying the optimised control protocol as described above, the power generating system 20, 120 is able to increase the upper limit of its 'normal' operating range from 1.13 pu to 1.23 pu. Furthermore, the over-modulation range of the power generating system 20, 120 is also increased so that it extends between 1.23 pu and 1.44 pu, owing to the influence of the tap changer control as described herein. By contrast, an equivalent power generating system which does not include a tap changer 40 would have an upper limit of its 'normal' operating range of 1.13 pu.

The optimised operating parameters S1-S7 are stored on the memory device 55 as a control protocol, which can be read by the converter and transformer modules 52, 54 during operation of the power generating system 20, 120, as will be described later. The optimised operating parameter data can then be updated by the determining module 50 in response to receiving updated configuration inputs.

Figure 8:
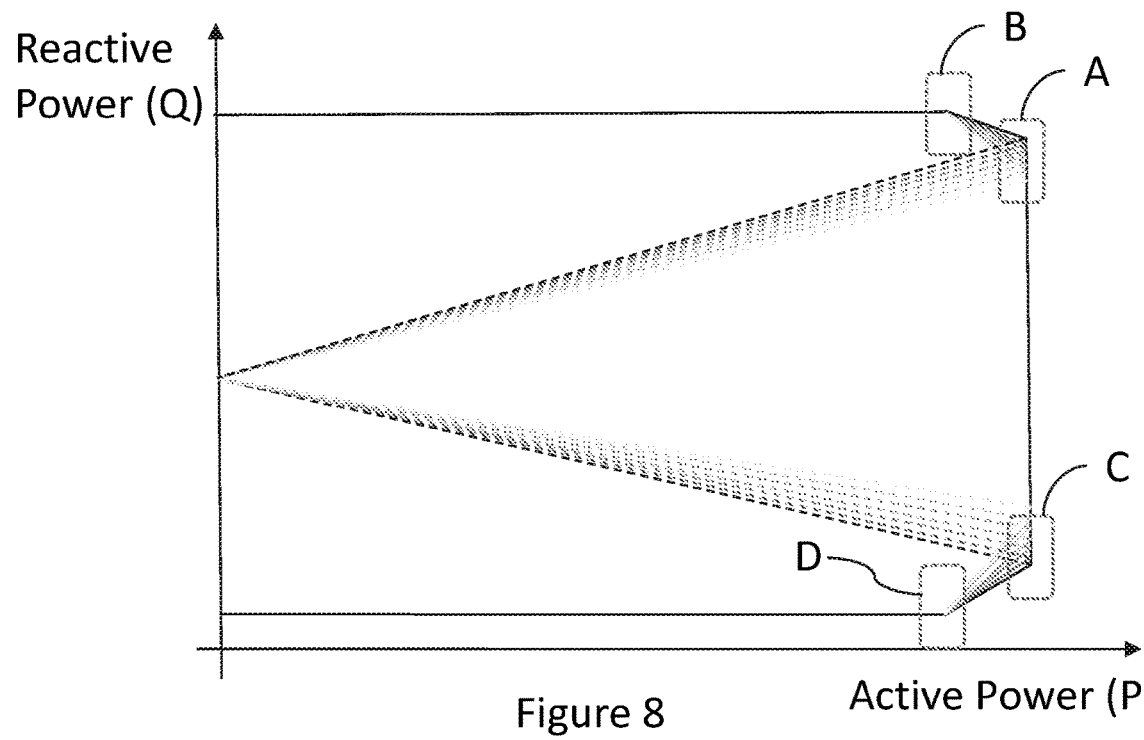
FIG. 8 is an optimised PQ chart corresponding to the power generating system of FIG. 2.
Figure 9:
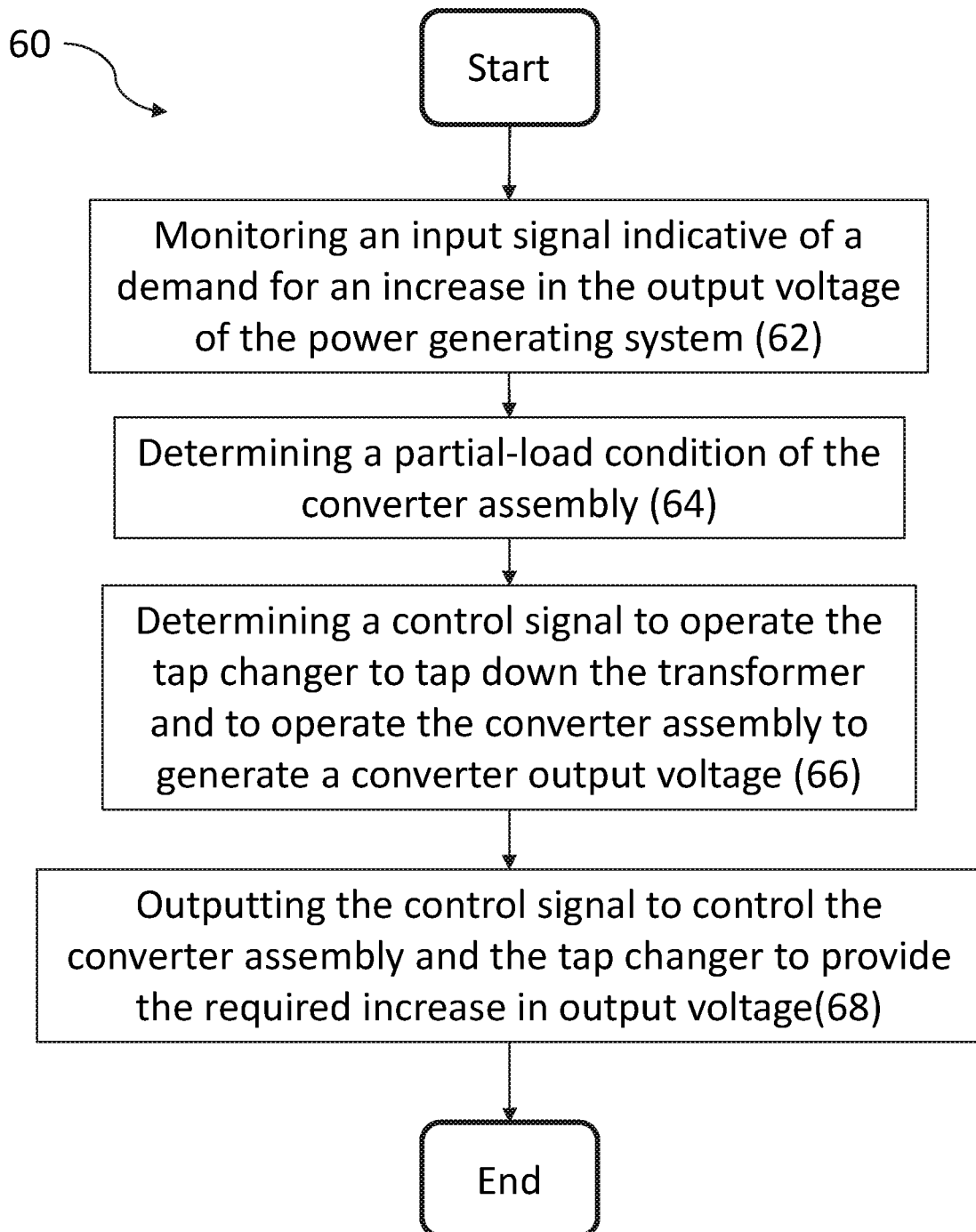
FIG. 9 shows a flow chart illustrating a first method of controlling the power generating system of FIGS. 2 and 3.

The control protocol can be presented as a series of active power vs. reactive power PQ charts, as shown in FIG. 8. The PQ charts represent the power generating capability of the power generating system 20, 120 when it is controlled with respect to the optimised operating parameters S1-S7. Each PQ chart indicates the reactive power Q transmitted to the grid 28 with respect to the active power P. The different shaded lines correspond to the power generating capability of the power generating system 20, 120, when it is operated according to the respective operating parameters S1-S7.

The highlighted regions A, B, C and D each represent a point on the PQ chart which is of particular interest to the operation of the power generating system 20, 120. For example, region A corresponds to a situation in which the power generating system 20, 120 may be controlled to transmit reactive power +Q into the grid 28, whereas region C corresponds to a situation in which the system is controlled to absorb reactive power-Q from the grid.

The above described determination of the optimised operating parameters S1-S7 (as shown in FIG. 7) corresponds to point A on the PQ charts of FIG. 8. The determining module 50 is also configured to determine the optimised operating parameters for each of the points B, C and D. The resulting sets of optimised operating parameters are used to provide maximised PQ charts for the power generating system 20, 120, which thereby define the maximum power generating capability of the wind turbine 10.

As described above, the control protocol comprises a set of operating parameters which result in an optimised power output from the system 20, 120. In this situation, the desired change in reactive power output Q may be achieved without changing the operating mode C1-C7 of the converter assembly 30. With particular reference to FIG. 7, each of the optimised operating parameters S4-S7 involves operating the converter in operating mode C6. Accordingly, the desired power output voltage is obtained by switching the tap changer 40 between −10% and +5%. Thus, the tap changer 40 is used to provide at least a portion of the required increase in reactive power output Q. Advantageously, this control strategy reduces the number of times that the converter assembly 30 must be adjusted in order to change the reactive power output of the system, which thereby increases the operational life of the converter assembly 30.

With particular reference to FIG. 6, the controller 42 is configured to control the power generating system 12, 120 based on the optimised operating parameters S1-S7. In particular, the input 46 is arranged to receive a demand input—or demand input signal—which is indicative of a requirement to change the output voltage $U_O$ of the power generating system 20, 120. Such a demand signal may include, for example, a request for the power generating system 20, 120 to support the voltage in the grid 28.

The converter module 52 is configured to determine a converter control signal for controlling the converter assembly 30 and transformer module 54 is configured to determine a transformer control signal to control the tap changer 40 in order to meet the required change in output voltage and/or reactive power Q. According to an exemplary arrangement of the controller 42, the control signals are determined so as to configure the converter assembly 30 and the tap changer 40 based on the optimised operating parameters S1-S7, as defined in the control protocol.

For example, upon receiving an input signal indicative of a demand for the power management system 20, 120 to deliver an output voltage corresponding to 0.87 pu, the determining module 50 determines that the optimised operating parameter S1 is capable of achieving the required output. The converter module 52 then determines a converter control signal to control the converter assembly 30 to output a voltage of 0.9 pu (i.e. to operate the converter assembly 30 according to operating mode C3). The transformer module 54 also determines a tap changer control signal to control the tap changer 40 to tap down the converter voltage by a determined tap change adjustment value, such as-10%.

According to this arrangement, the controller 42 is configured to operate the power generating system 20, 120 according to the pre-determined control protocol, as previously determined by the determining module 50. The output 48 is arranged to transmit the control signals to the relevant components of the power generating system 20, 120, in order to control the operation of the converter assembly 30 and the tap changer 40, as necessary.

According to an alternative arrangement of the controller 42, the processing modules 50, 52, 54 are again configured to control the power generating system 20, 120 in dependence on receiving a demand for an adjustment in the output voltage $U_O$ to the grid 28. However, in this case the converter and transformer modules 52, 54 are arranged to operate the converter assembly 30 and the tap changer 40, respectively, without the need to consult the pre-determined operating protocol. In this way, the controller 42 is arranged to determine one or more control signals to control the power generating system 20, 120 according to a dynamic control scheme 60—or control method 60.

An exemplary method of operating the power generating system 20, 120 according to the dynamic control scheme 60 will now be described with reference to FIG. 9. The control method 60 commences with a first step 62 in which the controller 42 receives, via the input 46, an input signal indicative of a demand for an adjustment in the output voltage $U_O$ of the power generating system 20, 120. The demand for an increase in output voltage $U_O$ may correspond to a demand for increased power output PQ from the power generating system 20, 120. Accordingly, the controller 42 is configured to monitor the input signal to detect a grid voltage Us, which requires an adjustment in the output voltage $U_O$.

In a second method step 64, the determining module 50 determines a partial-load condition of the converter assembly 30. The partial-load condition corresponds to the converter assembly 30 being configured to output a converter output voltage $U_C$ which is substantially below the maximum converter output voltage. The partial-load condition also refers to situations wherein the power generating system 20, 120 is operated below a maximum power output for which the system is rated. In this situation, the partial-load condition refers to when the wind turbine 10 is operated during operating conditions W and/or X, i.e. below the 'over-modulation' operating condition Y.

It is noted that in each of the exemplary control methods described herein, the turbine load (i.e. the maximum mechanical load that the turbine can accommodate) is not tied to a specific range of modulation index values. Accordingly, the power generating system may not be limited to operating according to prescribed modulation range during certain turbine load conditions.

According to an exemplary operation of the wind turbine 10, the power generating system 20, 120 is initially controlled to operate at full active power P with an output voltage $U_O$ of 0.95 pu, To achieve this, the converter assembly 30 is operated in converter operating mode C3, and the tap changer 40 is configured in a neutral position. This combination of operating parameters generates a reactive power output Q of 1.396 pu, which corresponds to region A of the PQ chart shown in FIG. 8.

The controller 42 then receives an input signal indicative of a demand to increase the reactive power output Q to 1.451 pu. Upon receiving the input signal, the determining module 50 determines a number of possible configurations of the converter assembly 30 and tap changer 40 which would be able to achieve the required reactive power output Q. A first configuration comprises switching the converter assembly 30 to operate in converter mode C4 (corresponding to a converter output voltage $U_C$ of 1.05 pu) and retaining the tap changer 40 in its neutral position. Alternatively, the same reactive power output Q could also be achieved by switching the converter assembly 30 to operate in converter mode C4 and then tapping down the transformer 36 by 5% or 10%.

In a third method step 66, the converter module 52 determines a control signal to control the converter assembly 30 to operate in converter mode C4 and the transformer module 54 determines a control signal to tap down the transformer 36 by either 5% or 10%. Thus, each control signal is configured to operate the tap changer 40 and the converter assembly 30 in order to provide the required adjustment in reactive power output from the power generating system 20, 120.

By tapping down the tap changer 40 during the partial-load configuration of the converter assembly 30, the power generating system 20, 120 is able to achieve the requested reactive power output Q whilst minimising its output voltage $U_O$. The advantageous method also increases the potential over-voltage ride-through response during higher load conditions, thereby increasing the power generating system's 20, 120 ability to respond to demands from the grid 28. Put another way, the controller 42 retains its ability to adjust the tap changer 40 in response to future fluctuations in the grid voltage.

According to an aspect of the present invention, the control method 60 comprises controlling the tap changer 40 to adjust the transformer 36 according to a reduced tap changer adjustment. In this way, the tap changer 40 is controlled to adjust the transformer 36 by a tap change adjustment which is less than the maximum available tap change adjustment. For example, the control method 60 may comprise only tapping down the transformer by 5% instead of tapping down by the maximum 10%. Advantageously, the resulting tap change will still achieve the required increase in reactive power output Q whilst also limiting the number of tap changer adjustments—or tappings, which will thereby prolong the life of the tap changer 40. According to an alternative exemplary control method, the tap changer 40 may be controlled to adjust the transformer 36 by one or more suitable tap change adjustments being less than the maximum tap change adjustment, as would be appreciated by the skilled person.

In a final method step 68, the output 48 transmits the control signal(s) to the converter assembly 30 and to the tap changer 40 in order to control the operation of the power generating system 20, 120 to meet the demand from the grid 28.

As described above, the control method 60 is particularly suited for controlling the power generating system 20, 120 in situations when the wind turbine 10 is operating under conditions associated with operating conditions W and X. Referring again to FIGS. 4 and 5, the operating conditions W and X correspond to an under-modulation condition of the wind turbine 10. Accordingly, the controller 42 is arranged to receive a wind speed input—or wind speed signal-indicative of a wind speed in the area of the wind turbine 10. The wind speed signal comprises information relating to the wind speed in the local vicinity of the wind turbine 10. As such, the input 46 of the controller 42 is configured to receive a wind speed signal from a wind speed sensor which is arranged either on or near to the wind turbine 10. Alternatively, the wind speed signal may be derived from a measure of the torque which is applied by the wind to the rotor blades 18, as would be readily understood by the person having ordinary skill in the art.

The determining module 52 is configured to determine the speed of the wind that is incident upon the wind turbine 10, based on the wind speed signal. In turn, the determining module 50 is able to determine whether the power generating system 20, 120 is operating in one of the operating conditions W, X, Y and Z. Upon determining that the wind speed falls within at least one of the wind speed ranges associated with W and X (i.e. within an exemplary wind speed range of 0-10 m/s or 10-11 m/s, respectively), the controller 42 then proceeds to control the power generating system 20, 120 according to the control method 60, as described above.

Advantageously, the control method 60 increases the capacity of the power generating system 20, 120 to provide an overvoltage to the electrical grid 28. However, if an overvoltage capability is not desired, then the control method 60 may be disabled. In such a situation, the operation of the power generating system 20, 120 may revert back to being determined by the pre-determined operating protocol, as described above.

If the determining module 50 detects that the wind speed is outside the wind speed range of operating conditions W and X, then the controller 42 inhibits control of the power generating system 20, 120 according to control method 60. For example, if the wind speed is determined to be in the over-modulation range (i.e. operating condition Y), then the controller 42 will operate the power generating system 20, 120 according to an over-modulation control strategy 160, which is described in more detail below. Alternatively, if the wind speed is determined to be greater than a determined wind speed threshold value, such as 20 m/s for example (i.e. falling within the operating condition Z), then the controller 42 is configured to initiate a shut-down control strategy in order to protect the components of the power generating system 20, 120.

The controller 42 is also configured to receive signals indicative of the current wind speed so that the determining module 50 can determine where the current wind speed sits within wind speed range of the relevant operating condition W, X, Y, and Z.

If the wind speed is determined to be within the range of operating condition W (i.e. when the wind speed is between 0-10 m/s), then the controller 42 is configured to moderate the extent to which the transformer 36 is tapped down by the tap changer 40. To achieve this, the controller 42 is configured to only allow tapping down of the transformer 36 when an operating current $I_C$ of the converter assembly 30 is below an operating current threshold value, such as 1.0 pu, i.e. when the output power is between 0 to 5.04 MW, for example. Accordingly, the tapping down of the transformer 36 is inhibited when the operating current $I_C$ of the converter assembly 30 is at or above a threshold current IT. The threshold current $I_T$ defines a converter operating current which, if exceeded, may cause damage to the converter assembly 30 and/or other components of the power generating system 20, 120.

By moderating the tapping down of the transformer 36 in this way, the controller 42 is configured to safely increase the overvoltage capabilities of the power generating system 20, 120 without causing damage system 20, 120 or the grid 28. This control strategy also reduces harmonic distortion during overvoltage operating conditions. According to an alternative arrangement of the power generating system, the converter assembly 30 is configured such that it operates below 1.0 pu when the output power of the converter assembly 30 is determined to be within a range of power values, for example, between 0 and 4.96 MW.

If the wind speed is determined to be within the range of operating condition X (i.e. when the wind speed is between 10-11 m/s), the controller 42 is further determined to moderate the tapping down of the transformer 36. To achieve this, the determining module 50 determines a tap-down threshold value below which the tap changer 40 cannot be set. The tap-down threshold is determined such that it reduces linearly as the power output of the wind turbine 10 increases from 5.04 MW to 5.6 MW. Accordingly, a maximum tap-down threshold of −10% is determined when the wind speed is at 10 m/s, and a minimum tap-down threshold of 0% is determined when the wind speed is at 10 m/s. This prevents the operating current $I_C$ of the converter assembly 30 from exceeding a threshold current Ir. According to an alternative arrangement of the controller 42, the tap down threshold may be determined based on the operating current $I_C$ of the converter assembly 30.

With reference to the control method 60, as described above, the determining module 50 is configured to determine a tap change adjustment value which defines the extent to which the transformer 36 is tapped up or tapped down by the tap changer 40. For example, the determining module 50 is configured to determine whether to tap down the transformer 36 by either 5% or 10%. In this situation, the determining module 50 receives an indication that the wind speed is at 11 m/s. Alternatively, the determining module 50 may detect that the power generating system 20, 120 is outputting power at 5.6 MW (i.e. the upper limit of operating condition X). Accordingly, the tap-down threshold is set to 0%, thereby preventing any tapping down of the transformer 36. The transformer module 54 is then configured to generate a control signal which retains the tap changer 40 in a neutral position.

It is noted that the controller 42 is configured to allow tapping up of the transformer 36 at any time whist the power generating system 20, 120 is operated according to operating conditions W or X, since this would not cause any adverse effects to either the grid 28 or the power generating system 20, 120.

Over-Modulation Control Scheme 160

Figure 10:
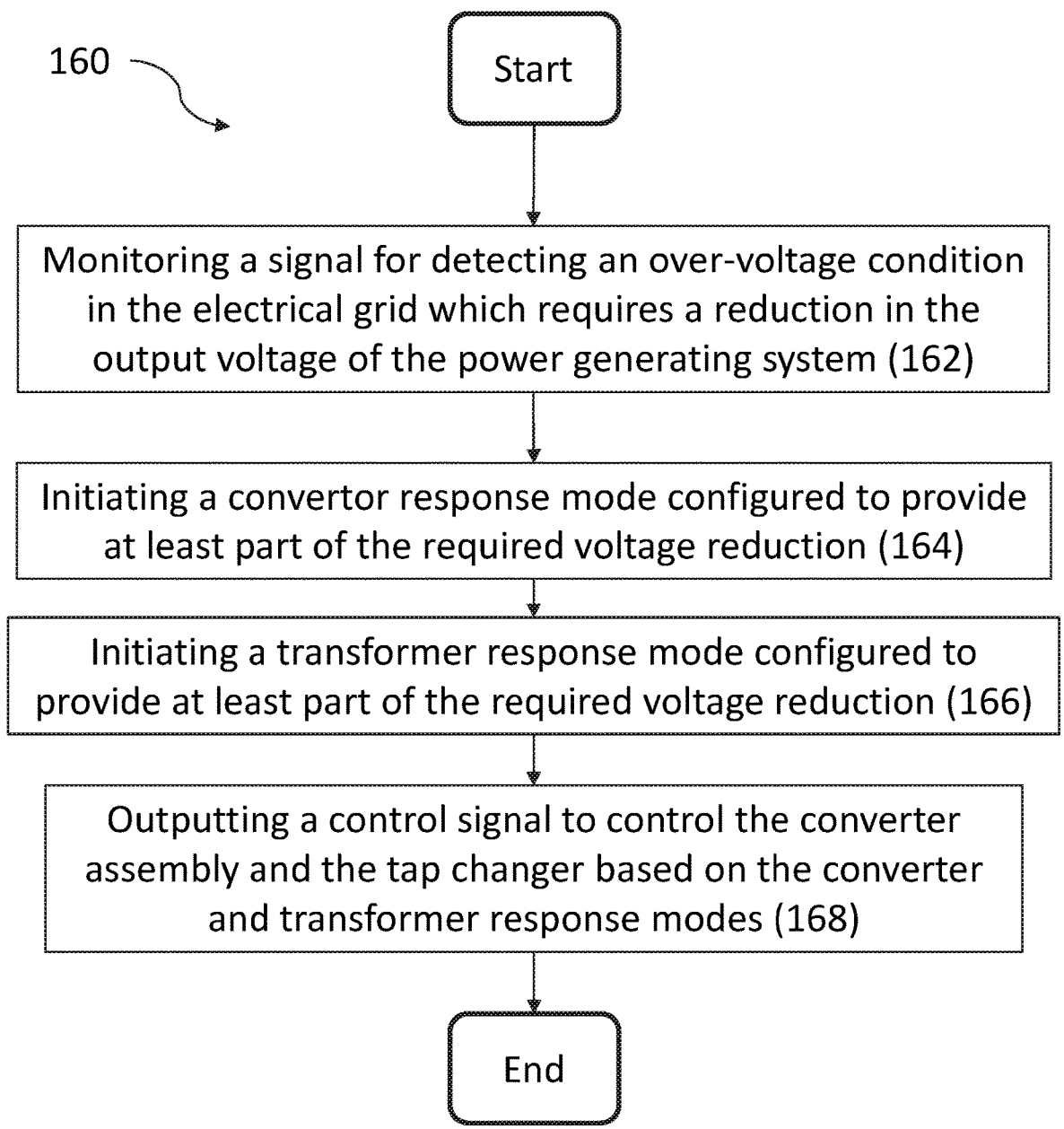
FIG. 10 shows a flow chart illustrating a second method of controlling the power generating system of FIGS. 2 and 3.

According to a second aspect of the invention, the controller 42 is configured to control the tap changer 40 and the converter assembly 30 according to an over-modulation control scheme 160, as shown in FIG. 10. The control scheme 160 is particularly suited to situations when the wind turbine 10 is operating in wind speeds of between 11-20 m/s (i.e. corresponding to operating condition Y).

The primary function of the controller 42, when operating according to the control scheme 160, is to increase the operating capabilities of the power generating system 20, 120 during over-modulation operating conditions.

In a first method step 162 of the over-modulation control scheme 160—or control method 160—the input 46 is configured to receive a signal indicative of the grid voltage $U_G$ of the electrical grid 28. In a second step 164, the determining module 50 is configured to detect an over-voltage condition requiring a reduction in the output voltage $U_O$ of the power generating system 20, 120.

In a third method step 166, the converter module 52 is arranged to determine a converter control signal to operate the converter assembly 30 in order to provide at least part of the required voltage reduction. The transformer module 54 is also arranged to determine a transformer control signal to adjust the tap changer 40 to tap down the transformer 36 in order provide at least part of the required voltage reduction.

The output 48 is arranged, upon detection of the over-voltage condition, to transmit the converter and transformer control signals in a fourth method step 168 to provide the required reduction in the output voltage of the power generating system 20, 120. The converter response mode and the transformer response mode are initiated so that they are implemented at least partially during the same period of time.

The converter module 52 is configured to operate in a converter response mode such that it is arranged to control the converter assembly 36 to respond to the over-modulation condition. Similarly, the transformer module 54 is configured to operate in a transformer response mode such that it is able to control the tap changer 40 to adjust the transformer 36 to respond to the detected over-modulation condition.

Advantageously, the control method 160 configures the controller 42 to react to extreme over-modulation voltages in the electrical grid 28 by using both the converter and transformer response modes to counteract the over-voltage. The converter assembly 36 can be adjusted quickly to accommodate the voltage demand. By contrast, the tap changer 40 is slower to react but it provides a more efficient and stable means of reducing the output voltage $U_C$ which can therefore be sustained indefinitely.

After a period of time following the initiation of the converter and transformer response modes, the converter module 52 is arranged to cancel the converter response mode. The controller 42 therefore reverts to operating the power generating system 20, 120 according to just the transformer response mode. The transformer response mode is arranged to retain the tap changer 40 in the required tap changer position so as to provide the required output voltage $U_O$.

According to this exemplary control method, the predetermined period of time after which the converter response mode is cancelled is determined by the determining module 50 to be no more than 2 seconds. As such, the predetermined period provides the controller 42 with sufficient time to initiate the tap changer 40 to adjust the transformer 36 in accordance with the transformer response mode control before the converter response mode is shut down. Alternatively, the predetermined time period may be determined in dependence on the severity of the over-modulation, as will be described in more detail below.

The transformer response mode represents a tap changer adjustment mode 86 in which the transformer module 54 is arranged to tap down the voltage of the transformer in response to the demand from the grid 28. The converter response mode includes a number of different converter control strategies, as shown in the table of FIG. 11. Each of the converter control strategies can be implemented by the converter module 52 in response to the demand for the change in voltage from the grid 28.

A first converter control strategy comprises a DC voltage $U_{dc}$ adjustment mode 82 in which the grid side converter 34 is configured to increase a voltage across the DC link 38 above a rated value.

A second converter control strategy comprises a reactive power absorption mode 84 in which a reduction in voltage is generated across a grid choke of the utility grid 28. Reducing the voltage drop across the grid choke leads to a reduction in the voltage output requirement for the converter 34 and therefore a reduced DC voltage output from the power generating system 20, 120.

A third converter control strategy comprises an over-modulation mode 88 in which a modulation index of the grid side converter 90 is increased to a value in an over-modulation range. The over-modulation range is determined by the determining module 50 based on the monitored operating parameters of the power generating system 20, 120. Alternatively, a pre-determined over-modulation range may be stored on in the form of a lookup table on the storage device 55. A fourth converter control strategy comprises a pulse wave modulation blocking mode 90 in which the grid side converter 90 is operated to inhibit pulse wave modulation and allow negative power flow through a DC link chopper of the DC link 38.

Upon detecting the over-modulation condition, the determining module 50 is arranged to determine the severity of the over-modulation condition. To achieve this, the determining module 50 assigns the detected over-modulation with a severity value based on the magnitude of the required change in output voltage $U_O$. The converter and transformer modules 52, 54 are then configured to initiate at least one of the converter and transformer control strategies based on the determined severity value. A first severity value corresponds to the grid voltage $U_G$ being within a range that requires an output voltage $U_O$ which can normally be output by the converter assembly 30 (i.e. a modulation index of less than 1 pu). The first severity value corresponds to a grid voltage $U_G$ which corresponds to a modulation index in a linear range of control for the power generating system. A second severity value corresponds to the grid voltage $U_G$ being within a range that requires the converter assembly 30 to generate a voltage that is within an over-modulation voltage range (i.e. a modulation index of between 1 pu and 1.1 pu). A third severity value corresponds to the grid voltage Us being such that it requires a voltage that exceeds the over-modulation voltage range (i.e. a modulation index greater than 1.1 pu). The third severity value corresponds to a grid voltage $U_G$ value being greater than a maximum synthesizable range of the power generating system.

Upon determining that the detected modulation corresponds to the first severity value, the transformer module 54 controls the tap changer 40 to tap down the transformer 36 according to the tap changer adjustment mode 86, and the converter module 52 controls the converter assembly 30 to reduce the voltage generated across the grid choke of the DC link 38 of the converter in accordance with the reactive power absorption mode 84.

In the situation where the determining module 50 determines that the detected modulation corresponds to the second severity value, then the transformer module 54 is configured to initiate the tap changer adjustment mode 86 and the converter module 52 initiates at least one of the reactive power absorption mode 84, the over-modulation mode 88 and the $U_{dc}$ adjustment mode 82.

Upon determining that the detected over-modulation is within the third severity value range, the transformer module 54 is configured to initiate the transformer response mode and the converter module 52 is arranged to initiate at least one of the reactive power absorption mode 84, the over-modulation mode 88, the $U_{dc}$ adjustment mode 82 and the pulse wave modulation blocking mode 90. Advantageously, the determining module 50 is configured to engage more of the converter control strategies when a severe over-modulation condition is detected, in order to provide a sufficiently large voltage change as required by the grid 28.

For each of the scenarios relating to the three different severity values, the converter module 52 may be configured to initiate one or more of the different converter control strategies 82, 84, 88 and 90. Once the determining module 50 has determined which of the severity levels corresponds to the detected over-modulation condition, the determining module 50 is then also configured to determine which of the relevant converter and transformer control strategies should be initiated. The determining module 50 is also arranged to determine when the chosen control strategies should be initiated, and for how long. For example, in some instances the converter module 52 may initiate all of the relevant control strategies at the same time, and in conjunction with the transformer control strategy.

The determining module 50 is also arranged to determine the duration of each of the converter and transformer control strategies in order to provide an optimal response to the required voltage change. To achieve this, the determining module 50 is configured to assign a rank to each of the transformer and converter control strategies 82, 84, 86, 88 and 90. The rankings, as shown in the table of FIG. 11, are determined based on the speed at which the control strategy can be implemented in order to counteract the over-modulation condition. The rankings also take into account the stability of the control strategy and their respective capacity to affect the over-modulation condition.

The reactive power absorption mode 84 can be applied for relatively long periods (i.e. a number of minutes) it does involve some degree of converter control, which can affect the overall operation of the converter assembly 30. The $U_{dc}$ adjustment mode 82 should be limited to a duration of just a few seconds because high DC voltages in the converter assembly 30 can impact the stability of an insulated-gate bipolar transistor of the power generating system 20, 120. For example, the reliable operation of the transistor can be affected by cosmic rays.

The over-modulation mode 88 involves allowing the converter assembly 30 to operate with up to 10% additional voltage range and it can be applied quickly (i.e. within 1 to 2 seconds) but this approach can cause high-harmonic output from the converter assembly 30. The pulse wave modulation blocking mode 90 can be applied quickly but it is most effective when only applied for a very short duration (i.e. less than 2 seconds) because it can generate a negative power flow which must be dissipated in the DC link chopper in order to prevent the voltage in the DC link 38 from increasing too much. The tap changer adjustment 86 can be applied indefinitely, and it is highly efficient but it has a slow response time because it takes several seconds from the initial operation of the tap changer 40 to adjust the transformer 36 before the actual reduction in the voltage can occur.

The rankings may be assigned differently to each the severity values, depending on the preferred means of counteracting the voltage demand. The rankings are pre-determined by the determining module 50, according to the control method 160 and then stored in the storage device 55 in the form of a lookup table. Alternatively the rankings may be pre-loaded into the storage device 55 before the controller 42 is installed within the wind turbine 10.

According to the exemplary arrangement of the control method 160, as shown in FIG. 11, the determining module 50 is configured to assign a ranking of 1 to the tap changer adjustment mode 86, and a ranking of 2 to the reactive power absorption mode 84. Due to its greater ranking the reactive power absorption mode 84 will be initiated in preference to the tap changer adjustment mode 86 because the required voltage level is such that it can be addressed by the operation of the converter assembly 36 within its normal operation. If the over-modulation condition continues at the current level (i.e. severity level 1), despite the application of the reactive power absorption mode 84, then the tap changer adjustment mode 86 is also initiated. The reactive power absorption mode 84 may then be cancelled after a pre-determined period, leaving the tap changer adjustment mode 86 to provide the required change in voltage, for an indefinite period, or until the over-modulation severity level changes.

If an over-modulation condition falling within the voltage range of the second severity level is detected, then the tap changer adjustment mode 86 is required to provide at least some of the required change in output voltage $U_O$. Each of lower ranked converter control strategies (i.e. the reactive power absorption mode 84, the over-modulation mode 88 and the $U_{dc}$ adjustment mode 82) are initiated at the same time as the tap changer adjustment mode 86 in order so that they can start to address the over modulation in the period before the tap changer adjustment mode 86 can respond.

The converter control strategies are then cancelled after a pre-determined period of time according to their assigned ranking. The over-modulation mode 88 and the $U_{dc}$ adjustment mode 82 are cancelled after a first determined period of time, for example, less than two seconds following the initiation of the converter response mode. The reactive power absorption mode 84 is then cancelled after a second determined period of time, for example one minute. Advantageously, the converter response mode provides a fast response which helps to mitigate the initial risk posed by the over-modulation condition. Then, once the transformer response mode has been implemented, the converter response mode can then be cancelled in a step-wise fashion, in order to increase the operational stability of the converter assembly 30.

Droop Control Scheme 260

Each of the first and second control methods 60, 160 correspond to a wind turbine 10 which is operated to support the voltage and power levels in a grid 28. According to a third aspect of the present invention the power generating system 20, 120 may be controlled to provide enhanced power generating capacity when operating in a grid-forming mode.

Grid-forming power generators are typically arranged to set the voltage that will be supplied to the loads on the grid. It is known to control power generating systems according to a droop control scheme when the wind turbine 10 is configured to operate in a grid-forming mode. Such control schemes are used, typically, in order to control power sharing within electrical power grids, thereby removing the need to provide separate communication networks to coordinate the operation of the power generating systems connected to the electrical grid. However, such droop control strategies can lead to voltage amplitude errors, which compromise the output power capability of the power generating system.

According to a third aspect of the present invention the power generating system 20, 120 is controlled according to a droop control scheme 260—or control method 260—in order to extend the power output capacity of the power generating system 20, 120 by controlling the tap changer 40 to overcome the deficiencies of known droop control strategies.

Figure 12:
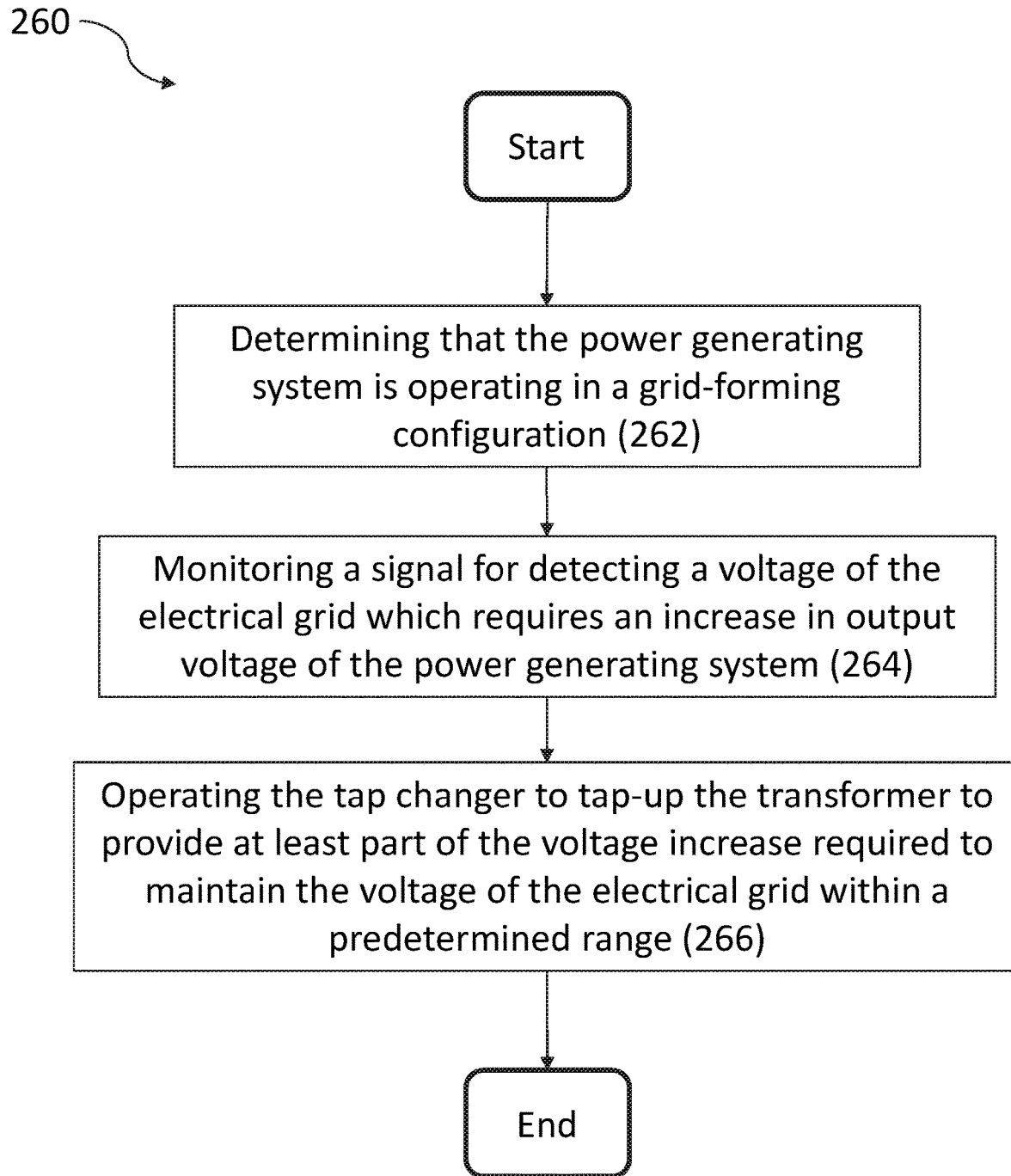
FIG. 12 shows a flow chart illustrating a third method of controlling the power generating system of FIGS. 2 and 3.
Figure 13:
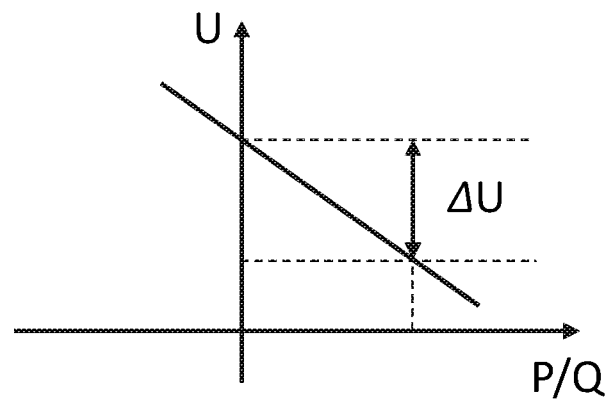
FIG. 13 is a schematic representation of a droop control strategy for the power generating system of FIGS. 2 and 3.

The control method 260 will now be described with reference to FIGS. 12 and 13. The control method 260 commences with a first step 262 in which the determining module 50 is arranged to determine that the power generating system 20, 120 is operating in a grid-forming configuration by outputting a reference voltage $U_{ref}$ from the converter assembly 30 to the electrical grid 28. The power generating system 20, 120 is also configured to update the reference voltage $U_{ref}$ in order to maintain the grid voltage $U_G$ within a pre-determined voltage range.

In a second method step 264, the input 46 receives a signal for detecting that the grid voltage $U_G$ requires an increase in output voltage $U_O$ from the power generating system 20, 120, i.e. in order to maintain the grid voltage $U_G$ within the desired voltage range. The determining module 50 is arranged to monitor the input signal and determine whether the grid voltage $U_G$ has dropped to a level which compromises the power output capability of the wind turbine 10 according to a predefined PQ chart. The characteristic drop in grid voltage is represented by the $\Delta U$ as illustrated by the schematic graph shown in FIG. 13.

The transformer module 54 is then configured, in a third method step 266, to operate the tap changer 40 to tap up the transformer 36 in order to provide at least part of the voltage increase required to maintain the grid voltage $U_G$ within the predetermined range. Hence, the transformer module 54 controls the tap changer 40 to tap back the output voltage $U_O$ to a level which allows the power generating system 20, 120 to output the required power P, Q according to the predefined PQ chart without changing the converter voltage reference $U_{ref}$. The control method 260 thereby provides increased flexibility when configuring the wind turbine 10 in a grid-forming configuration to provide PQ reference values to the electrical grid 28.

Once the tap changer 40 has been adjusted then the reference voltage $U_{ref}$ which was used previously to control the converter assembly 30 will no longer correspond to the conventional droop control, as determined by the determining module 50 in method step 262. The change in the tap position of the tap changer 40 effectively causes a decoupling of the converter voltage reference $U_{ref}$ from the grid voltage $U_G$ such that the previously used converter voltage reference $U_{ref}$ can no longer be used to control the converter assembly 30 in order to match the demands of the grid 28. In this way, the previous converter voltage reference $U_{ref}$ defines an old converter voltage reference $U_{ref-old}$ or an un-tapped reference voltage.

Consequently, if the old converter voltage reference $U_{ref-old}$ were used to determine the future droop control strategy of converter assembly 30, it would likely lead to errors in the grid-forming operation of the wind turbine 10. For example, the controller 42 may incorrectly configure the power generating system 20, 120, based on the old reference voltage $U_{ref-old}$ to provide voltage to the grid 28 based on an inaccurate understanding of the voltage which is being outputted from the high-voltage side of the transformer 36.

To address this problem, the controller 42 is configured in a further method step to update the converter voltage reference $U_{ref-old}$ based on the tap position of the tap changer 40. To achieve this, the controller 42 is configured to monitor a first input signal indicative of a tap position—or tap changer position—of the tap changer 40, and a second input signal indicative of the old converter voltage reference $U_{ref-old}$. The controller 42 is then configured to determine a new reference voltage $U_{ref-new}$ based on the first and second input signals.

The first input signal comprises a tap changer control signal configured to control the tap position of the tap changer 40. The second input signal is received from a droop control module (not shown) of the controller 42, which is configured to control the converter assembly 30 when the power generating system 20, 120 is arranged in a grid-forming configuration and when the tap changer 40 is configured in a neutral position (i.e. not tapped up or tapped down). Accordingly, the droop control module is configured to operate the power generating system as if it were not fitted with a tap changer 40, as would readily be understood by a person having ordinary skill in the art.

According to an exemplary aspect of the control method 260, the determining module 52 is configured to calculate a new voltage reference $U_{ref-new}$ using the following equation:

$$U_{ref-new} = \frac{n_2 + \Delta n * N_{TC}}{n_2} U_{ref-old}$$

The new converter voltage reference $U_{ref-new}$ defines the voltage reference which is recalculated following the tap changer adjustment. In this way, the new converter voltage reference $U_{ref-new}$ represents a 'tap-adjusted' converter voltage reference. Furthermore, $n_2$ represents the number of windings at the high-voltage side of the transformer; $N_{TC}$ is the tap position of the tap changer; and $\Delta n$ is the change in the number of windings at the high-voltage side of the transformer 36 for a given tap position.

The control method 260 is particularly applicable for the determination of a voltage amplitude component of the converter voltage reference $U_{ref}$. By recalculating the voltage amplitude component, based on the tap position of the tap changer 40, the controller 42 is able to enhance the power output capability of the power generating system 20, 120.

The droop control scheme 260 may be implemented to regulate the exchange of active P and reactive Q power within the electrical grid, in order to control the grid voltage frequency and amplitude. In this way, the droop control scheme 260 is arranged to decrease the delivered active power P when the grid voltage frequency increases and decrease the delivered reactive power Q when the grid voltage amplitude increases. The droop control scheme 260 can be implemented when the power generating system 20, 120 is operated in an islanded-mode and also in a grid-connected mode, as would be readily understood by the skilled person.

Fault Ride Through (FRT) Detection Scheme

The above described control scheme 260 is designed to operate the power generating system 20, 120 to control the voltage which is provided to the electrical grid 28 by the wind turbine 10. With reference to the first method step 262 of control method 260, the demand to adjust the output voltage $U_O$ of the power generating system 20, 120 requires that the controller 42 is able to determine the voltage at the high-voltage side of the transformer 36. This is needed in order to determine the extent to which the output voltage $U_O$ of the power generating system 20, 120 must be adjusted in order to meet the demand from the grid 28.

The presence of the tap changer 40 in the system means that the controller 42 is prevented from accurately determining the demand for a change in output voltage $U_O$. In particular, the operation of the tap changer 40 (i.e. the tapping up or tapping down of the tap changer 40) disguises any voltage fault ride through (FRT) from the high-voltage side to the low voltage side of the transformer 36. In this situation, the controller 42 may incorrectly configure the power generating system 20, 120 to provide reactive power to the grid 28 based on an inaccurate understanding of the voltage being outputted from the high-voltage side of the transformer 36.

It is known to monitor the voltage at the high-voltage side of the transformer $U_{HV}$ in order to detect FRT operating conditions. However, such techniques require additional voltage sensors to be accommodated within the power generating system, which therefore increases the cost and complexity of the wind turbine.

The controller 42 is arranged, according to an aspect of the present invention, to determine the voltage at the high-voltage side of the transformer 36, without the need for additional monitoring equipment. Accordingly, the controller 42 is configured to execute a fault ride through detection scheme. To achieve this, the controller 42 is configured to monitor a first input signal indicative of a tap position—or tap changer position—of the tap changer 40, and a second input signal indicative of the voltage at the low-voltage side of the transformer 36. The controller 42 is then configured to control the output voltage $U_O$ of the power generating system 20, 120 based on the first and second input signals.

The first input signal comprises a tap changer control signal configured to control the tap position of the tap changer 40. Alternatively, the first input signal may include a tap changer sensor signal from a sensor which is configured to monitor the current tap position of the tap changer 40. The second input signal comprises sensor data which is received from a voltage sensor that is arranged to monitor the voltage at the low voltage side of the transformer 36. The voltage data may be measured at any suitable point between the converter assembly 36 and the low voltage side of the transformer 36, as would be readily understood by the person having ordinary skill in the art.

According to a first FRT detection scheme, the determining module 52 is configured to calculate a virtual 'low-voltage' $U_{LV\text{-}virtual}$ using the following equation:

$$U_{LV-virtual} = \frac{n_2 + \Delta n * N_{TC}}{n_2} U_{LV}$$

Figure 14:
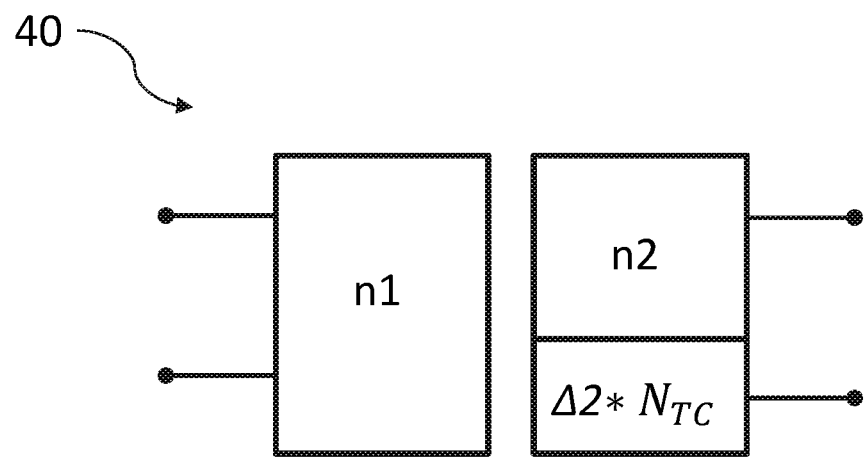
FIG. 14 is a schematic of a tap changer of the power generating system of FIGS. 2 and 3.

$U_{LV}$ represents the measured voltage at the low voltage side of the transformer 36 whereas the virtual low voltage $U_{LV\text{-}virtual}$ defines the voltage at the low voltage side of the transformer 36 if the tap changer 40 was not installed. Put another way, the virtual low voltage $U_{LV\text{-}virtual}$ represents the voltage at the low voltage side of the transformer 36 when the tap changer 40 is configured in a neutral tap position. FIG. 14 illustrates a schematic tap changer 40 of the power generating system 20, 120 according to the present invention. The parameter $n_2$ represents the number of windings at the high-voltage side of the transformer; $N_{TC}$ is the tap position of the tap changer; and $\Delta n$ is a change in the number of windings at the high-voltage side for a given tap position.

Upon calculating the virtual low-voltage value $U_{LV\text{-}virtual}$, the determining module 50 determines whether either the 'virtual' or 'measured' low-voltage values (i.e. $U_{LV\text{-}virtual}$ or $U_{LV}$) are within an FRT voltage range or a continuous voltage range. The FRT voltage range is a voltage range corresponding to a low or high voltage fault ride through condition. The continuous voltage range corresponds to a normal operating condition of the power generating system 20, 120.

If the virtual low-voltage value $U_{LV\text{-}virtual}$ is determined to be within the FRT voltage range and the measured low-voltage value ULv is determined to be within the continuous voltage range, then the controller 42 is configured to generate a reactive current reference based on the virtual low-voltage value $U_{LV\text{-}virtual}$ and an associated k-factor. All other control aspects of the power controller 42 are determined based on the normal operating condition of the power generating system 20, 120.

Alternatively, if both the 'virtual' and 'measured' low-voltage values ($U_{LV\text{-}virtual}$ and $U_{LV}$) are determined to be within the FRT voltage range, then the controller 42 is again configured to generate a reactive current reference based on the virtual low-voltage value $U_{LV\text{-}virtual}$ and an associated k-factor. However, in this case the controller 42 is configured to operate the power generating system 20, 120 according to a conventional FRT control scheme, i.e. in the same way that would be expected for a power generating system which does not include a tap changer device (i.e. as if it were a directly measured high-voltage transformer voltage $U_{HV}$).

According to a second FRT detection scheme, the determining module 52 is configured to estimate a 'high-voltage' value $U_{HV\text{-}estimate}$ according to the following equation:

$$U_{HV-estimate} = \frac{n_2 + \Delta n * N_{TC}}{n_1} U_{LV} + I * Z_{HV}$$

The estimated high-voltage transformer voltage $U_{HV\text{-}estimate}$ represents the voltage at the high-voltage side of the transformer 36 if the tap changer 40 was not installed in the power generating system 20, 120. The parameter $n_1$ represents the number of windings at the low-voltage side of the transformer 36. The parameter $I$ represents the current of the transformer 36 and $Z_{HV}$ represents the impedance at the high-voltage side of the transformer 36. The remaining parameters of the equation are the same as those described for the first FRT detection scheme.

The parameters $I$ and $Z_{HV}$ are each composed of real and imaginary parts as defined by the following equations:

$$I = I_{active} + jI_{reactive}$$

$$Z_{HV} = R_{HV} + jX_{HV}$$

$I_{active}$ and $I_{reactive}$ represent the active and reactive currents corresponding to the transformer 36, respectively. $R_{HV}$ and $X_{HV}$ represent the resistance and reactance of the transformer 36, respectively.

According to an exemplary operation of the controller, the determining module 52 is configured to estimate the 'high-voltage' value $U_{HV\text{-}estimate}$ according to the following simplified equation:

$$U_{HV-estimate} = \frac{n_2 + \Delta n * N_{TC}}{n_1} U_{LV} + I_{reactive} * X_{HV}$$

The estimated high-voltage side transformer voltage $U_{HV\text{-}estimate}$ is used by the controller 42 to detect whether there is an FRT condition associated with the power generating system 20, 120. Furthermore, the estimated high-voltage transformer voltage $U_{HV\text{-}estimate}$ can also be used in a conventional FRT control scheme in the same way as a directly measured high-voltage transformer voltage $U_{HV}$.

According to the above described method of determining the voltage at the high voltage side of the transformer 36, the controller 42 is able to adjust the power generating system 20, 120 based on either virtualised or estimated voltage data, and can thereby avoid FRT issues whilst avoiding the need to accommodate additional monitoring equipment within the wind turbine 10.

Although the first and second FRT detection schemes have been described herein with reference to the controller scheme 260, it will be appreciated that the same FRT detection methods may also be applied in a similar fashion to the control methods 60 and 160.

Efficiency Control Scheme

Given the deployment of wind turbines in remote off shore locations, it is considered that a local wind power plant controller of a wind turbine may have access to more accurate weather estimation modelling and data mining capabilities than the traditional distribution system operators (DSOs) and transmission system operators.

Accordingly, the local power plant controller (PPC), such as the controller 42 described herein, is configured with additional functionality such as estimation of wind power and distribution. The controller 42 is arranged to receive information relating to how long the wind turbine 10 will be required to run in a high-power, mid-power and low-power configuration.

The determining module 50 is arranged to monitor a signal indicative of an operating time corresponding to local wind speed and distribution. The determining module 50 is configured to determine time value in which wind turbine is predicted to operate in each of the high-power, mid-power or low-power configurations. Each of the determined time values is matched to an active and reactive power reference $P_{ref}$, $Q_{ref}$ corresponding to the predicted output power of the converter assembly 36 for that power configuration.

The determined time values comprise time of day data as well as duration data corresponding to the predicted wind conditions for the location of the wind turbine 10. The converter module 52 is configured to control the converter assembly 30 based on the determined time values in order to achieve the optimum active and reactive power outputs P, Q for any given operating period of the wind turbine 10. The transformer module 54 is configured to control the tap changer 40 to adjust the transformer 36 in order to reach a desired voltage level based on the determined time values. The desired voltage levels increase the operational efficiency of the power generating system 20, 120 for a given active and reactive power output P, Q.

The determining module 50 is configured to produce an efficiency protocol based on determined time values and associated operating parameter data. The efficiency protocol is stored on the storage device 55 and can be updated by the determining module 50 based on new wind condition inputs. The controller 42 is arranged to then control the power generating system 20, 120 according to the efficiency protocol. The primary objective of the control method is to determine the most cost efficient operation of the power generating system 20, 120 based on the prevailing wind conditions. In particular, the controller 42 is configured to determine whether it is cost effective to adjust the tap changer 40 based on the predicted wind conditions, or whether it would be preferable to maintain the tap changer 40 in its current configuration.

If a high power wind condition is predicted to continue for a time period which exceeds a threshold value, then the tap changer 40 is configured to tap up the transformer in order to achieve a more efficient output from the power generating system 20, 120. However, if the high power wind condition is predicted to terminate before exceeding the threshold time period, then the benefit of adjusting the tap changer 40 is reduced such that it will be retained in its current tap position. The required voltage change is then obtained by controlling the converter assembly 30.

The control method 360 can thereby avoid the unnecessary movement of tap changer 40 to extend its lifetime and reduce long term maintenance costs associated with the power generating system 20, 120. The control method 360 can also apply to the operation of the converter assembly 30, which thereby enables greater control the output voltage $U_O$.

The power generating system 20, 120 is described herein as comprising a single transformer 36. The transformer 36 may comprise a medium or a high voltage transformer as would be understood by the skilled person. Furthermore, the power generating system 20, 120 may comprise one or more transformer devices without departing form the scope of the present invention.

Each of the processing modules 50, 52 and 54 are contained within the memory device 55 of the controller. The control protocol is also stored on the memory device 55 can be adapted by a user of the power generating system 20, 120 in order to suit the preferred operating parameters of a power plant controller (PPC) of the grid 28, as would be readily understood by a person having ordinary skill in the art.

The processor 44 is configured to perform the computer-implemented functions of the processing modules 50, 52 (e.g. performing a control method as will be described in more detail below). The instructions when executed by the processor 44 cause the processor 44 to perform determining and controlling operations, including providing control commands to the various components of the power generating systems 20, 120.

The controller 42 forms part of a central control system of the power generating systems 20, 120. As such, the controller 42 may be incorporated into any number of computer based control systems of the power generating systems 20, 120. It should be appreciated by the person having ordinary skill in the art that the controller 42 is described herein as being arranged in electronic data communication with the components of the power generating systems 20, 120 using a wired connection, as illustrated by the dotted lines in FIGS. 2 and 3. However, in other exemplary arrangements, the power generating systems 20, 120 may be coupled to the controller 42 via a wireless connection, such as by using any suitable wireless communications protocol known in the art. Thus, the controller 42 may be configured to receive one or more signals from the power generating system 20, 120, wirelessly.

The invention claimed is:

1. A method of operating a power generating system for a wind turbine connected to an electrical grid, the power generating system comprising a power generator, a converter, a transformer and a tap changer, the method comprising:
   when operating the power generating system in a grid-forming configuration:
      operating the converter to provide a converter voltage reference to maintain a grid voltage in a predetermined voltage range; and
      monitoring a signal for detecting a voltage of the electrical grid which requires an increase in output voltage from the power generating system in order to maintain the grid voltage within the predetermined voltage range;
   operating the tap changer to tap-up the transformer to provide at least part of the voltage increase required to maintain the grid voltage within the predetermined voltage range; and
   upon determining that the tap changer is out of a neutral position, updating the converter voltage reference based on a position of the tap changer.

2. The method of claim 1, wherein updating the converter voltage reference comprises:
   monitoring a first signal indicative of the position of the tap changer;
   monitoring a second signal indicative of the converter voltage reference corresponding to the tap changer being operated in the neutral position; and
   determining a new converter voltage reference based on the first and second signals.

3. The method of claim 2, wherein determining the new converter voltage reference comprises:

$$U_{ref-new} = \frac{n_2 + \Delta n * N_{TC}}{n_2} U_{ref-old}$$

wherein the new converter voltage reference $U_{ref-new}$ defines a 'tap-adjusted' converter voltage reference, $n_2$ is a number of windings at a high-voltage side of the transformer, $N_{TC}$ is the position of the tap changer, and $\Delta n$ is a change in the number of windings at the high-voltage side of the transformer for a given tap position.

4. The method of claim 3, wherein the new converter voltage reference comprises voltage amplitude.

5. The method of claim 1, further comprising operating the power generating system in an islanded configuration.

6. The method of claim 1, further comprising operating the power generating system in a grid-connected configuration.

7. The method of claim 1, wherein monitoring the signal for detecting an over-voltage condition in the electrical grid comprises:
monitoring a first signal indicative of the position of the tap changer;
monitoring a second signal indicative of a voltage at a low-voltage side of the transformer; and
determining the voltage at a high-voltage side of the transformer based on the first and second signal.

8. The method of claim 7, wherein determining the voltage at the high-voltage side of the transformer comprises:

$$U_{LV-virtual} = \frac{n_2 + \Delta n * N_{TC}}{n_2} U_{LV}$$

wherein $U_{LV-virtual}$ defines a virtual voltage at the low-voltage side of the transformer when the tap changer is configured in a neutral position, $n_2$ is a number of windings at a high-voltage side of the transformer, $N_{TC}$ is the position of the tap changer, $\Delta n$ is a change in the number of windings at the high-voltage side for a given tap position, and $U_{LV}$ defines the actual voltage at the low-voltage side of the transformer; and
wherein an over-voltage condition is detected if both the virtual voltage $U_{LV-virtual}$ and the actual voltage ULv are determined to be within an over-voltage range.

9. The method of claim 7, wherein determining the voltage at the high-voltage side of the transformer comprises:

$$U_{HV-estimate} = \frac{n_2 + \Delta n * N_{TC}}{n_1} U_{LV} + I_{reactive} * X_{HV}$$

wherein $U_{HV-estimate}$ defines an estimated voltage at the high-voltage side of the transformer when the tap changer is configured in a neutral position, $n_2$ is a number of windings at a high-voltage side of the transformer, $n_1$ is a number of windings at the low-voltage side of the transformer, $N_{TC}$ is the position of the tap changer, $\Delta n$ is a change in the number of windings at the high-voltage side for a given tap position, $U_{LV}$ defines the actual voltage at the low-voltage side of the transformer, $I_{reactive}$ is a reactive current of the transformer, and $X_{HV}$ is an impedance of the transformer; and
wherein an over-voltage condition is detected if the estimated voltage $U_{HV-estimate}$ is determined to be within an over-voltage range.

10. A controller for controlling a power generating system comprising a power generator, a generator side converter, a grid side converter, a transformer, a tap changer for a wind turbine, the controller being arranged to be connected to the power generating system and configured to control the power generating system according to an operation, comprising:
when operating the power generating system in a grid-forming configuration:
operating the converter to provide a converter voltage reference to maintain a grid voltage in a predetermined voltage range; and
monitoring a signal for detecting a voltage of an electrical grid which requires an increase in output voltage from the power generating system in order to maintain the grid voltage within the predetermined voltage range;
operating the tap changer to tap-up the transformer to provide at least part of the voltage increase required to maintain the grid voltage within the predetermined voltage range; and
upon determining that the tap changer is out of a neutral position, updating the converter voltage reference based on a position of the tap changer.

11. A power generating system for a wind turbine which is connected to an external electrical grid, the power generating system comprising a converter, a transformer, a tap changer, and a controller, the controller comprising:
an input arranged to receive a signal indicative of a voltage of the electrical grid;
a determining module arranged to detect a voltage of the electrical grid which requires an increase in output voltage from the power generating system in order to maintain the grid voltage within a predetermined voltage range;
a converter control module arranged to operate the converter to provide a converter voltage reference to maintain the grid voltage in the predetermined voltage range;
a transformer control module arranged to determine a transformer control signal to control the tap changer to adjust the transformer; and
an output arranged, upon detection of a demand to increase the grid voltage, to transmit the transformer control signal to operate the tap changer to tap-up the transformer to provide at least part of the voltage increase required to maintain the grid voltage within the predetermined voltage range, wherein the controller is arranged to, upon determining that the tap changer is out of a neutral position, update the converter voltage reference based on a position of the tap changer.

* * * * *